(12) United States Patent
Rinearson et al.

(10) Patent No.: US 7,143,084 B1
(45) Date of Patent: Nov. 28, 2006

(54) PERIODIC PERSONALIZED MEDIA SYSTEM, AND ASSOCIATED METHOD

(75) Inventors: Peter Mark Rinearson, Mercer Island, WA (US); Dale Askew, Lynnwood, WA (US); Erik Speckman, Seattle, WA (US); Jason Malcolm, Renton, WA (US); Robert Gale, Seattle, WA (US); Giselle Smith, Seattle, WA (US); Steven Wainwright, Seattle, WA (US)

(73) Assignee: Alki Sofware Corporation, Seattle, WA (US)

( * ) Notice: Subject to any disclaimer, the term of this patent is extended or adjusted under 35 U.S.C. 154(b) by 362 days.

(21) Appl. No.: 10/171,799

(22) Filed: Jun. 13, 2002

Related U.S. Application Data

(60) Provisional application No. 60/298,333, filed on Jun. 13, 2001.

(51) Int. Cl.
G06F 7/00 (2006.01)
G06F 17/30 (2006.01)
G06F 17/00 (2006.01)

(52) U.S. Cl. ................................ 707/3; 707/104.1
(58) Field of Classification Search .............. 707/3, 707/104.1
See application file for complete search history.

(56) References Cited

U.S. PATENT DOCUMENTS

| | | | |
|---|---|---|---|
| 5,031,161 A | 7/1991 | Kendrick | |
| 5,056,029 A | 10/1991 | Cannon | |
| 5,555,496 A | 9/1996 | Tackbary et al. | |
| 5,983,200 A | 11/1999 | Slotznick | |
| 6,065,002 A | 5/2000 | Knotts et al. | |
| 6,069,848 A | 5/2000 | McDonald et al. | |
| 6,212,548 B1 * | 4/2001 | DeSimone et al. | 709/204 |
| 6,340,978 B1 | 1/2002 | Mindrum | |
| 6,453,300 B1 | 9/2002 | Simpson | |
| 6,519,639 B1 * | 2/2003 | Glasser et al. | 709/224 |
| 6,546,399 B1 | 4/2003 | Reed et al. | |
| 6,600,501 B1 * | 7/2003 | Israel et al. | 715/810 |
| 6,697,824 B1 * | 2/2004 | Bowman-Amuah | 709/229 |
| 2002/0002558 A1 * | 1/2002 | Krause | 707/104.1 |

OTHER PUBLICATIONS

Stephen Rhind-Tuff, 'A different direction for electronic publishers-how indexing can increase functionality', Apr. 2001, Alexander Street Press, pp. 1-3.*

Academy Of Achievement, "Rosa Parks Biography," pp. 1-3, http://www.achievement.org/autodoc/printmember/par0bio-1 [Accessed Nov. 10, 2005].

(Continued)

*Primary Examiner*—Don Wong
*Assistant Examiner*—Cheryl M Shechtman
(74) *Attorney, Agent, or Firm*—Perkins Coie LIP

(57) ABSTRACT

In one embodiment, a method for generating personalized information includes receiving age data related to the age of a first person, receiving a request for information from a user, and automatically identifying relevant event data in a database based on the age data. The relevant data includes information about a second, famous person different from the first person and wherein the second, famous person was involved with an associated event. The relevant data is associated with an age of the second, famous person when the second, famous person was involved with the associated event. The age of the second, famous person is with respect to a granularity of less than a year. The method further includes automatically providing the relevant data to the user.

22 Claims, 45 Drawing Sheets

OTHER PUBLICATIONS

Alki Software, "When They Were 23, What 101 Fascinating People Did When They Were 23," First Edition: Dec. 2002, 5 Representative pages., 7 pages.

Alki Software, "When They Were 33, What 101 Fascinating People Did When They Were 33," Representative pages, 7 pages.

Baker, J., "Who did what when? Tolstoy's Bicycle," 1995, pp. vi-ix, 216-219, Helicon Publishing Limited, Oxford, United Kingdom.

Morris, D., "The Book of Ages," 1983, 7 pages, The Viking Press, New York.

Netg, "Since You Were Born," Apr. 13, 1988, 2 pages, http://www.whealth.org/exhibit/control/sinceborn/sinceborn.cgi, Saint Louis Zoological Park [Accessed Oct. 12, 2005].

Nowlan, R.A., "Born This Day: A Book of Birthdays and Quotations of Prominent People Through the Centuries," 1996, pp. 1, McFarland & Company, Inc.

Postman, A, et al., "What's in an age? Who Did What When, From Age 1 to 100," 1999, 5 pages, William Morrow and Company, New York, N.Y.

Ruane, T., "Half-life," Winter 1996, pp. 118-127, Southern Review (PSRV), V. 32, No. 1, Dialog(R)file.

Sampson, Anthony and Sally, "The Oxford Book of Ages," 1985, pp. vii-xiii, 64-67, Oxford University Press, Oxford, United Kingdom.

* cited by examiner

Who was the youngest when they accomplished the following:

A. Leonard Bernstein composed "Arias and Barcarolles"

B. Paul Simon saw recording "Cecilia" certified gold

C. Michael Jackson met the king of Pop art

PERIODIC PERSONALIZED MEDIA SYSTEM, AND ASSOCIATED METHOD

CROSS-REFERENCE TO RELATED APPLICATION(S)

This application claims the benefit of U.S. Provisional Patent Application No. 60/298,333, filed Jun. 13, 2001.

TECHNICAL FIELD

The disclosed embodiments relate to periodic personalized media systems using a database and/or network to deliver data.

BACKGROUND

The Internet comprises a vast number of computers and computer networks interconnected through communication channels. The Internet is used for a variety of purposes, including electronic commerce, exchanging information such as electronic mail, retrieving information, and the like. Many standards have been established for exchanging information over the Internet, such as electronic mail, Gopher, and the World Wide Web ("WWW"). The WWW service allows a server computer system (i.e., web server or web site) to send text and/or graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser or other application suited to viewing or manipulating information provided via the internet or an intranet. A browser is typically a special-purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over hand-held devices, such as cell phones and portable computers (e.g., PDA's).

BRIEF DESCRIPTION OF THE DRAWINGS

FIG. 13 is a MSNBC home page that includes the TOTHEDAY portion.

FIG. 14 is an Encarta home page that includes the TOTHEDAY portion.

FIG. 15 is a MSN Calendar page that includes a TOTHEDAY portion.

FIG. 26 is a My Netscape home page that includes the TOTHEDAY portion.

FIG. 30 is a My Yahoo home page that includes the TOTHEDAY portion.

FIG. 35 is a Yahoo TOTHEDAY page that includes the TOTHEDAY portion.

Figure 1:
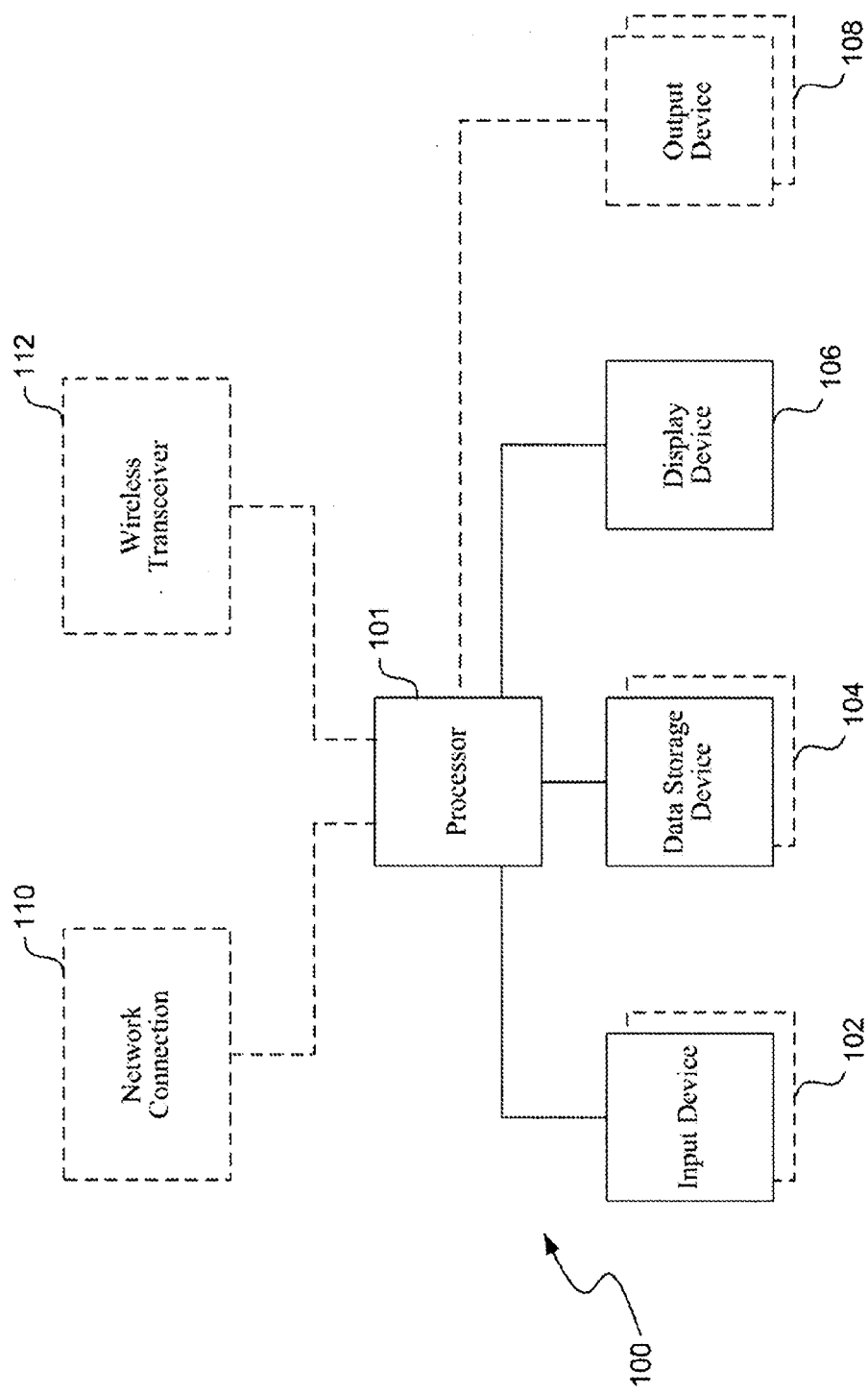
FIG. 1 is a block diagram of a suitable computer for employing aspects of the invention.

Note: the headings provided herein are for convenience and do not necessarily affect the scope or interpretation of the invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 510 is first introduced and discussed with respect to FIG. 5).

A portion of this disclosure contains material to which a claim for copyright is made. The copyright owner has no objection to the facsimile reproduction by anyone of the patent document (including Figures), as it appears in the Patent and Trademark Office patent file or records, but reserves all other copyright rights whatsoever.

DETAILED DESCRIPTION

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Unless described otherwise herein, the blocks or functionality depicted in the Figures are well known or described in detail in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the Figures and the detailed description provided in the provisional patent application.

Described below are methods and systems for personalizing content to relate to a user's exact age. In one embodiment, a user provides data related to his or her age, such as a date of birth. Using this data, a computer calculates the user's exact age in days and then searches a database for data associated with the exact age. The data in the database can include information about events that occurred in the lives of people, such as notable or famous people, organized by the exact age of each person at the time of the event. The server can then provide the user with information about an event that occurred in the life of a notable person when the notable person was the same age as the user. In some cases there may not be data associated with the exact age of the user and data associated with an age close to the exact age or data associated with a range of ages must be used. Furthermore, the ages of people other than the user can also be used. Many alternative embodiments are possible, as described below.

Representative System

FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, embedded computers, cellular or mobile phones, multi-processor systems, microprocessor-based or programmable consumer electronics, set-top boxes, network PCs, mini-computers, mainframe computers and the like. The invention can be embodied in a special-purpose computer or data processor that is specifically programmed, configured or constructed to perform one or more of the computer-executable instructions explained in detail below. Indeed, the term "computer," as used generally herein, refers to any of the above devices, as well as any data processor.

As described below, aspects of the invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EPROM chips), as well as distributed electronically over the Internet or over other networks (including wireless networks). Those skilled in the relevant art will recognize that portions of the invention may reside on a server computer or a network of server computer, while other portions reside on a client computer or a network of client computers. Data structures and transmission of data particular to aspects of the invention are also encompassed within the scope of the invention.

Referring to FIG. 1, one embodiment of the invention employs a computer 100, such as a personal or portable computer, having one or more processors 101 coupled to one or more user input devices 102 and data storage devices 104. The computer is also coupled to at least one output device such as a display device 106 and/or one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 1).

Figure 2A:
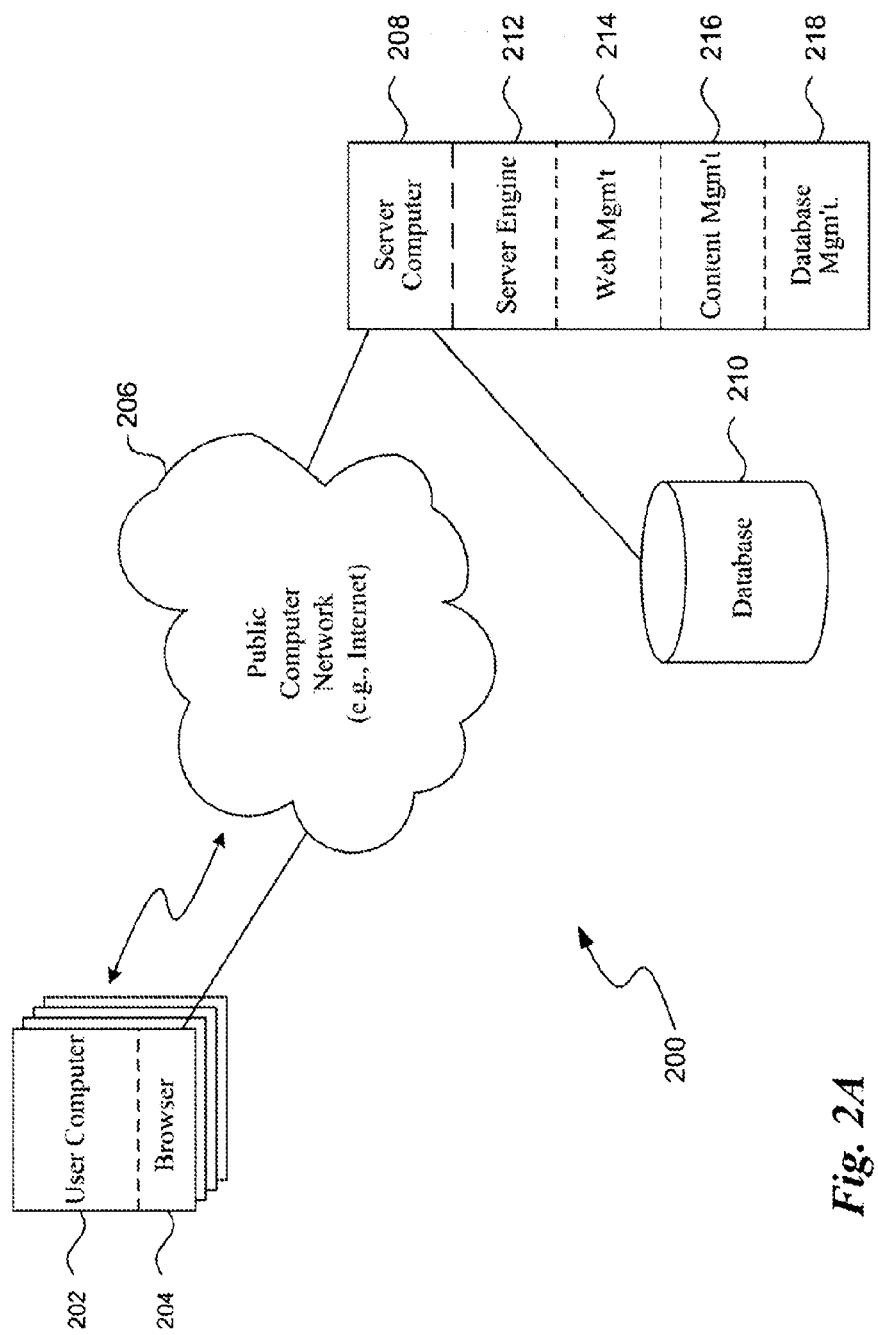
FIG. 2A is a block diagram illustrating a suitable system in which aspects of the invention may operate in a networked computer environment.

Aspects of the invention may be practiced in a variety of other computing environments. For example, referring to FIG. 2A, a distributed computing environment with a web interface includes one or more user computers 202 in a system 200 are shown, each of which includes a browser program module 204 that permits the computer to access and exchange data with the Internet 206, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives), such as described above with respect to FIG. 1. User computers may include other program modules such as an operating system, one or more application programs (e.g., word processing or spread sheet applications), and the like. The user computers 102 include wireless computers, such as mobile phones, personal digital assistants (PDA's), palm-top computers, etc., which communicate with the Internet via a wireless link. The computers may be general-purpose devices that can be programmed to run various types of applications, or they may be single-purpose devices optimized or limited to a particular function or class of functions.

At least one server computer 208, coupled to the Internet or World Wide Web ("Web") 206, performs much or all of the functions for receiving, routing and storing of electronic messages, such as web pages, audio signals and electronic images. While the Internet is shown, a private network, such as an intranet may likewise be used herein. The network may have a client-server architecture, in which a computer is dedicated to serving other client computers, or it may have other architectures such as a peer-to-peer, in which one or more computers serve simultaneously as servers and clients. A database 210 or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL) password protection schemes, encryption, and the like).

The server computer 208 may include a server engine 212, a web page management component 214, a content management component 216 and a database management component 218. The server engine performs basic processing and operating system level tasks. The web page management component handles creation and display or routing of web pages. Users may access the server computer by means of a URL associated therewith, such as http:\\www-.totheday.com. The content management component handles most of the functions in the embodiments described herein. The database management component includes storage and retrieval tasks with respect to the database, queries to the database, and storage of data such as the personalized biographical content described below.

Figure 2B:
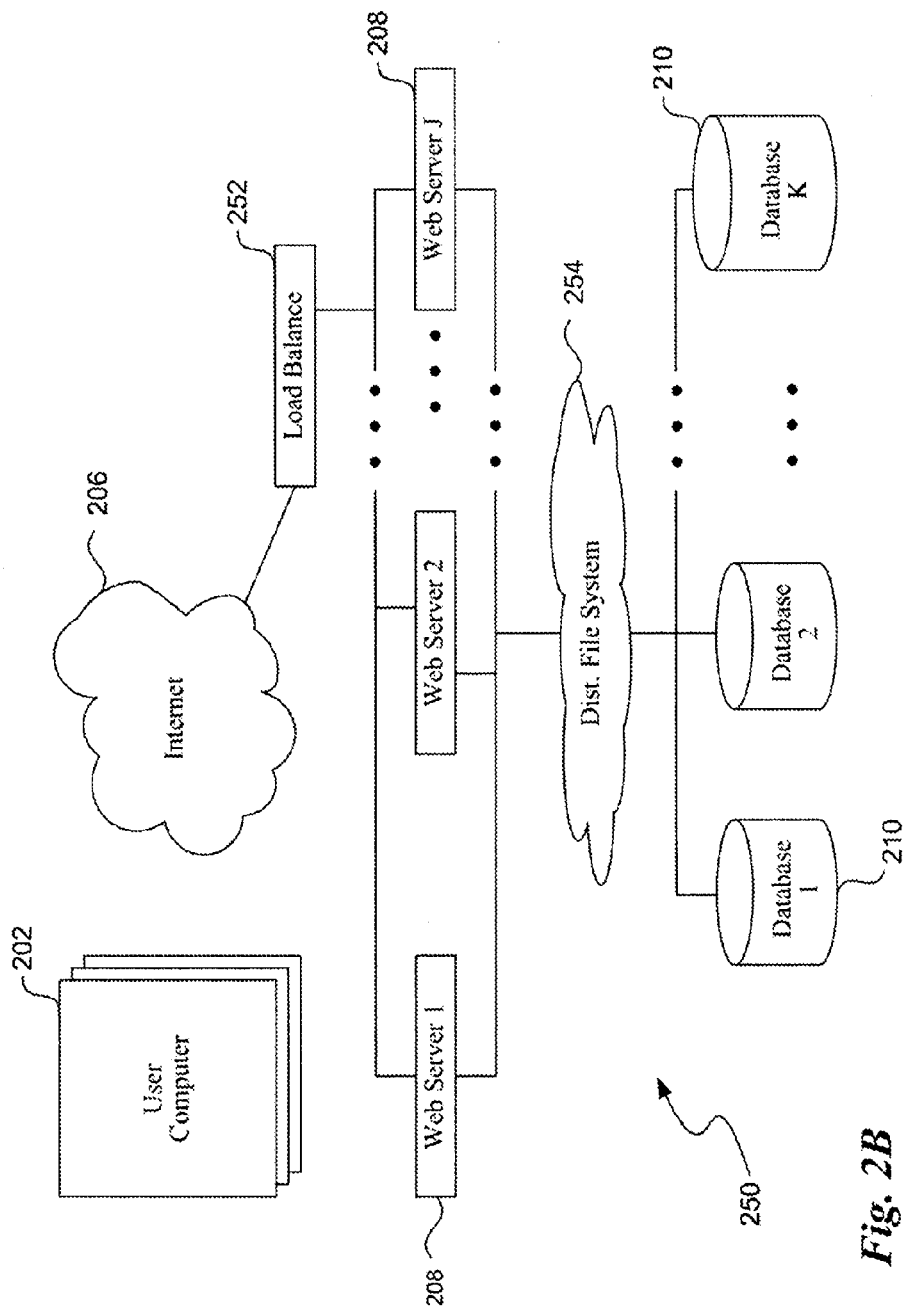
FIG. 2B is a block diagram illustrating an alternative system to that of FIG. 2A.

Referring to FIG. 2B, an alternative embodiment to the system 200 is shown as a system 250. The system 250 is substantially similar to the system 200, but includes more than one web server computer (shown as server computers 1, 2, . . . J). A web load balancing system 252 balances load on the several web server computers. Load balancing is a technique well-known in the art for distributing the processing load between two or more computers, to thereby more efficiently process instructions and route data. Such a load balancer can distribute message traffic, particularly during peak traffic times.

A distributed file system 254 couples the web servers to several databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

Figure 3:
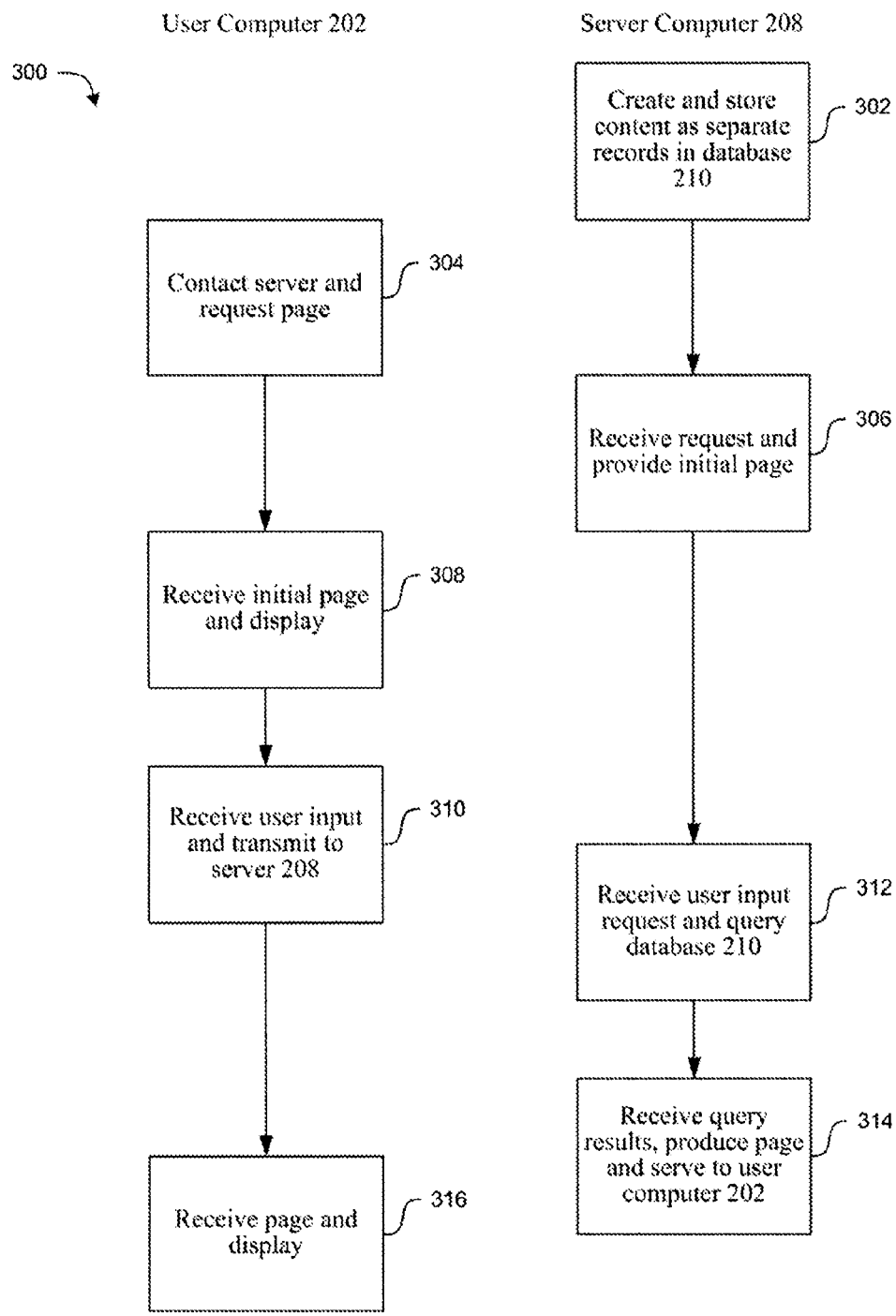
FIG. 3 is a flow diagram illustrating a suitable method for providing customized content under the systems of FIGS. 1–2B.

Referring to FIG. 3, an example of a method for providing personalized content to users is shown as a routine 300. Beginning in block 302, the server computer 208 creates and stores content as separate records in the database 210. For example, one or more content creation computers (not shown) generate content by obtaining biographical or other information from books, Web sites, or other sources. The content creation computers may be coupled to the server computer 210 directly, or via a local area network. Authors may use the content creation computers to complete fields in a form, where such a form provides the authors with a graphical user interface to readily input information in appropriate fields and thereby create a record for an event (as describe below). The records are then stored in the database 210.

One or more editing computers (not shown in the Figures) may retrieve some or all of the records from the database 210 to review and revise by editors in an editorial process. The editing system and methodologies are designed to allow the potential value of an event to be judged, prior to time and effort being spent writing and editing it. One determinant of the potential value of an event is whether or not the database already includes one or more events for that day-age (the age, expressed in days, of the person involved in the event). An event that shares a day-age with an event that is already identified in the database is less valuable than an event that populates a day age which has until that time been unpopulated. Another determinant of the potential value of an event is whether the categorization of the event (in other words, the meta data about it, such as "Area of Endeavor" or "Achievement Type," see below) duplicates that of an event that already exists for the day-age. For example, if there is already a sports-related event for a specific day-age, then an event that is being contemplated for inclusion in the database is less valuable if it sports-related than if it is not. To assist a writer or editor in making judgments about whether to invest resources in a potential event, the editing system allows the writer or editor to input the day of the event and immediately see a list of events that correspond (exactly or approximately) to the day-age of the event. This allows the editor or writer to determine whether it is worthwhile to invest effort in converting the potential event into an actual event.

Typically an event is recorded initially as a lead, and once a large number of leads have been accumulated a judgment is made as to which to write as (or "convert into") fully developed events or event records. The writing and editing process may involve give and take between the writer(s) and editor(s), with communication taking place in large measure through the use of the tool, which records notes that are maintained with the individual records. The editing system also keeps track of all versions of an evolving event record, which helps maintain quality control. Quality is also encouraged by the inclusion of data fields in which writers are required to list all sources used for an entry. This allows editors to spot-check to be sure that all facts in an item are sourced and that there is no plagiarism or use of unapproved sources. Once edited, the records are completed and flagged in the database 210 for use by users of the system described herein. The editing computers may likewise be coupled to the server directly, or via a network.

Some time thereafter, in block 304, the user computer 202 contacts the server 208 and may directly or implicitly request a page, such as the home page described below. If the service described herein is provided on a subscription basis, the user computer may be required to provide a username and password to be authenticated by the server. Under block 306, the server computer receives the request and provides an initial page, such as the home page described below.

Under block 308, the user computer 202 receives the home page and displays it the user. The user may then input information, such as a birth date, and transmit it to the server computer 208. In block 312, the server computer receives the user input information and queries the database 210. For example, the server computer computes the users age in days based on the birth date, and then queries the database for an event that occurred when a luminary was that same age in days. If the database fails to contain a record matching the exact query, logic running on the server computer commands the database to retrieve a record close to the age in days. Under block 314, the server computer receives the query results and produces a Web page to serve to the user computer. Under block 316, the user computer receives the page and displays it to the user. Blocks 310–316 may repeat. When a user computer 202 again contacts the server computer 208 to receive customized content, the user computer may again provide the user's birth date. Alternatively, the user's birth date may be provided to the server computer by way of a "cookie" or other automatic means.

As another alternative, the server computer may store the user's birth date in the database. When the user computer again contacts the server computer, the server computer recognizes the user based on some data (user name, cookie, etc.) and retrieves the user's stored birth date. Thus, when the user computer contacts the server computer (e.g. to simply receive the home page noted herein), the server computer automatically provides customized content based on the user's birth date, with the user having to input anything.

Representative Data Structures

Figure 4:
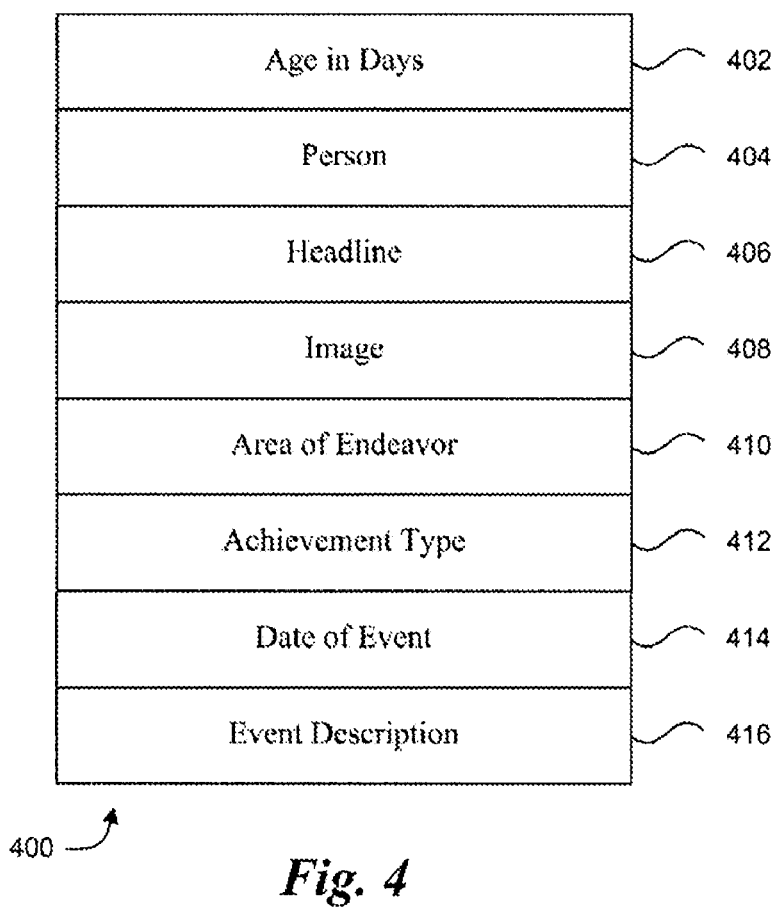
FIG. 4 is a data structure diagram of a suitable database record for storing content deliverable under the systems of FIGS. 1–2B.

Referring to FIG. 4, an example of a data structure stored in the database 210 is shown as a record 400. The record 400 includes a key field "age in days" 402. This field indicates the total number of days old a particular person was when he or she achieved some notable event. A person field 404 provides the name of the person who achieved the notable event on this date in his or her life, and a headline field 406 provides a headline for the event. An image field 408 may provide a link to an image file containing a picture of the person, or other relevant picture. An area of endeavor field 410 indicates one of several categories, such as activism, adventure/exploration, athletics/sports, birth, bizarre/unusual, business, children, citizenship, crime, death, design, divorce, education, employment/career, expression, fine arts, home, labor/trade/service/clerical, law, literature, marriage/partnership, media/communications, medical/psychology, military, misfortune, philanthropy, pilot/train engineer/ship captain, politics/government, religion/philosophy, science, society/celebrity, and technology/engineering, and entertainment. An achievement type field 412 indicates the type of achievement that the person achieved on this day, such as announcement, appointment, claim, condemnation/criticism, creation, first, good luck, guilt, heroism, honor, infamy, innocence, join, loss/failure, recognition/acclaim, record, resignation/firing, and victory/success.

A date of event field 414 provides the date when the event occurred. In the case of events that occurred over a period of time, or events in which the exact date is unknown but a range of dates within which the event occurred in known, the period of time can be used or a specific date chosen from the period. An event description field 416 provides a description of the event. The event description field may have certain limitations, such as being no more than 600 characters or words in length. Certain editorial rules may be applied to the event description field, such as requiring that the author provide a surprise ending or interesting final sentence for the description. In other embodiments, the record 400 can have people related fields, such as the person's date of death or the person's alias names (e.g. Mohammad Ali and Cassius Clay). In additional embodiments, the record 400 can have event related fields, such as the location of the event, the duration of the event, and a prioritization of the importance of the event.

While the term "field" and "record" are used herein, any type of data structure can be employed. For example, relevant data can have preceding headers, or other overhead data proceeding (or following) the relevant data. Alternatively, relevant data can avoid the use of any overhead data, such as headers, and simply be recognized by a certain byte or series of bytes within a serial data stream. Any number of data structures and types can be employed herein.

Representative User Interface

Referring to FIGS. 5 through 41, representative computer displays or web pages will now be described with respect to displaying personalized information. The web pages may be implemented in XML (Extensible Markup Language), XSL (Extensible Stylesheet Language) or HTML (HyperText Markup Language) scripts that provide information to a user. The web pages provide facilities to receive input data, such as a form with fields to be filled in, pull-down menus or entries allowing one or more of several options to be selected, buttons, sliders, or other known user interface tools for receiving user input in a web page. Of course, while one or more ways of displaying information to users in pages are shown and described herein, those skilled in the relevant art will recognize that various other alternatives may be employed. The terms "screen," "web page" and "page" are generally used interchangeably herein. While XML and HTML are described, various other methods of creating displayable data may be employed, such as the Wireless Access Protocol ("WAP").

The Web pages are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Figure 5:
FIG. 5 is an example of a TOTHEDAY home page.

Referring to FIG. 5, an example of a TOTHEDAY home page 500 that can be accessed by the user's computer 100 is shown. The home page 500 can have a display portion 516 describing the purpose and/or content of the web site. The home page 500 also includes fields 502 for the user to input age data so that the user's exact age in days and/or years and days can be calculated. For example, the home page 500 can have date of birth fields 502, such as a month drop-down menu, a day field, and a year field for the user to input his or her date of birth. The server 208 calculates the exact age of the user after the date of birth is input. Alternatively, the user can download an application, such as an applet, that will calculate the user's exact age on the user's computer 100. In one embodiment, a cookie can be placed on the user's computer 100 so that in subsequent visits to the web site the user's exact age can be calculated without the user entering his or her date of birth or other age data. In other embodiments, the user's age data can be stored in the database 210 and/or server computer 208. In these embodiments, the user could enter a user name and/or password associated with the age data. The home page 500 also includes terms of use radio buttons 504 that require the user to accept the terms of use before proceeding to the next web page. In one embodiment, a GO button 506 will not illuminate until the user has accepted the terms of use. The home page 500 further includes a left-hand column portion 512 listing several notable individuals, an accomplishment of each individual, and each individual's exact age at the time of the accomplishment.

The home page 500 can also include a subscribe link 508 that enables the user to receive TOTHEDAY messages every day for which there is data, every day for which there is data of a desired type, or on selected days. The user can choose to receive a message daily (as available) or only on days in which the message relates to a selected area of interest, such as sports. Sometimes the data delivered may be for an age-date that is approximate as illustrated below. The messages can be sent to the user's fax, voicemail, email account or wireless device, such as a pocket PC. The home page 500 also includes a My Circle section 510 that allows the user to track events associated with the exact age of the user's friends or others. This section 510 will be described in greater detail below. A sign out link 514 allows the user to sign out of the TOTHEDAY home page 500.

Figure 6:
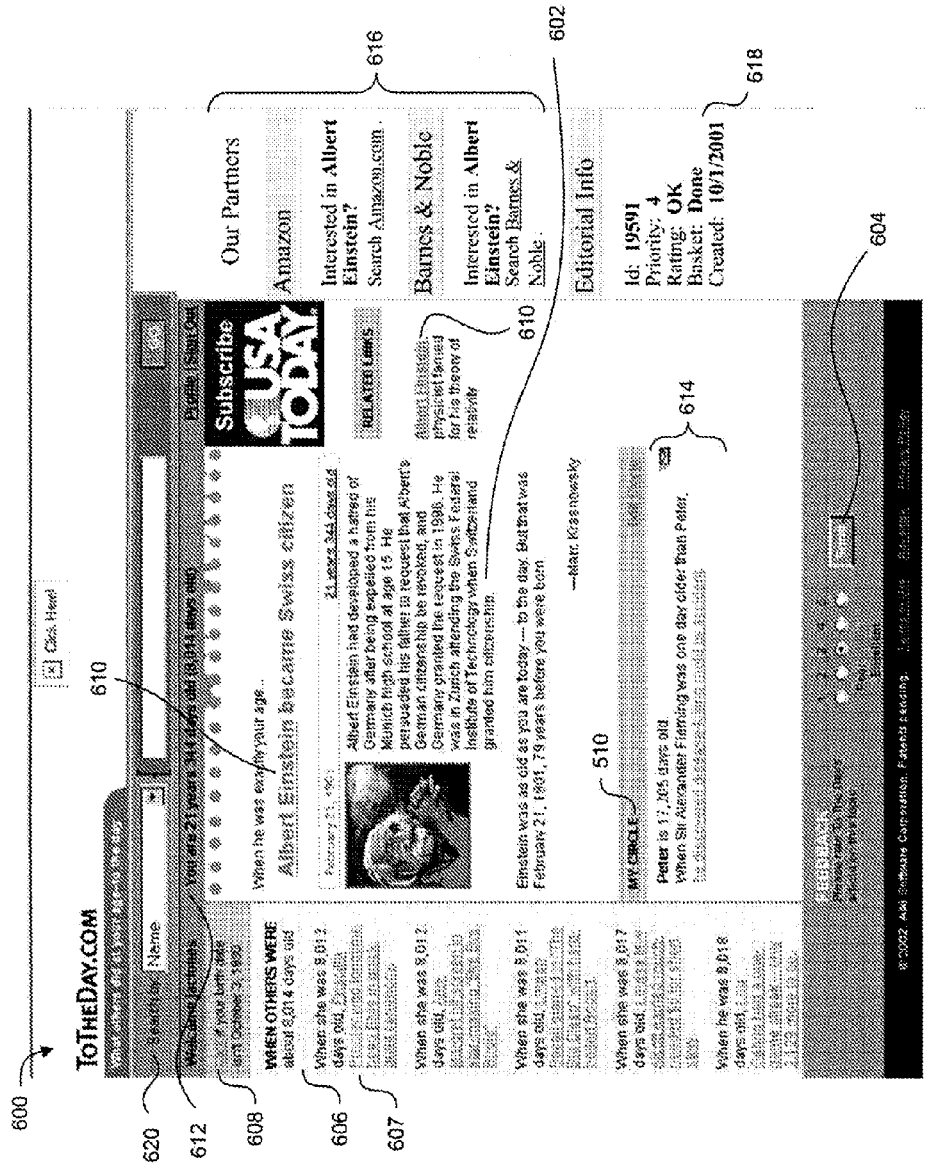
FIG. 6 is an example of an event page generated based on the exact age of the user.

FIG. 6 is an example of an event page 600 generated based on the exact age of the user. The event page 600 includes a display portion 602 describing an event or an accomplishment in the life of a notable person when the person was the exact age of the user. For example, the event can include the marriage, death, divorce, or illness of the notable person. In other embodiments, the event can be a point in the notable person's life, such as the midway point between birth and death. The display portion 602 also lists the name of the person, the date of the event, and the exact age of the person when the event occurred. In other embodiments, if the user was alive when the event occurred, the display portion can display the age of the user at the time of the event. The display portion 602 can also include a link 610 to a timeline listing other cataloged events in the life of the person (shown in FIG. 10). The event page 600 also includes a left hand column 606 describing other accomplishments or events that occurred in the life of the person and/or other notable people at an age close to the exact age of the user. The column 606 can include the names of the people, short descriptions of each event, and the exact age of each person at the time of the event. The column 606 can include links 607 to event pages (which can be similar to the event page 600) corresponding to each listed event.

The event page 600 also includes a user's age display 612 indicating the exact age of the user in days and/or years and days. Proximate to the age display 612 is a link 608 that allows the user to change his or her date of birth. The link 608 may direct the user to a web page similar to the home page 500 shown in FIG. 5. The event page 600 also includes a feedback portion 604 that permits the user to rate the article or description of the event on a scale of 1 to 5 with a poor to excellent rating, respectively. The feedback portion 604 can have rating buttons and a send button.

The event page 600 also includes links 616 to partner sites that may have materials, such as books, on related topics, such as the person described in the event. Thus, the page may link to merchants who provide products or services related to the person described. The organization providing the services described herein could then receive a percentage of sales from such merchants based on any users who may purchase products/services based on such a link.

Proximate to the links 616, the event page 600 has an editorial section 618 which is not displayed to the user but contains information used in the creation of the events. The event page 600 further includes the My Circle section 510 with a friends portion 614 that lists friends or others, the friends' exact ages, and events associated with the friends' exact ages. These events can include links to the corresponding event pages. The event page 600 also has a search section 620 so that the user can search for, e.g., an event by the name of the person involved or the age of the person at the time of the event.

Figure 7:
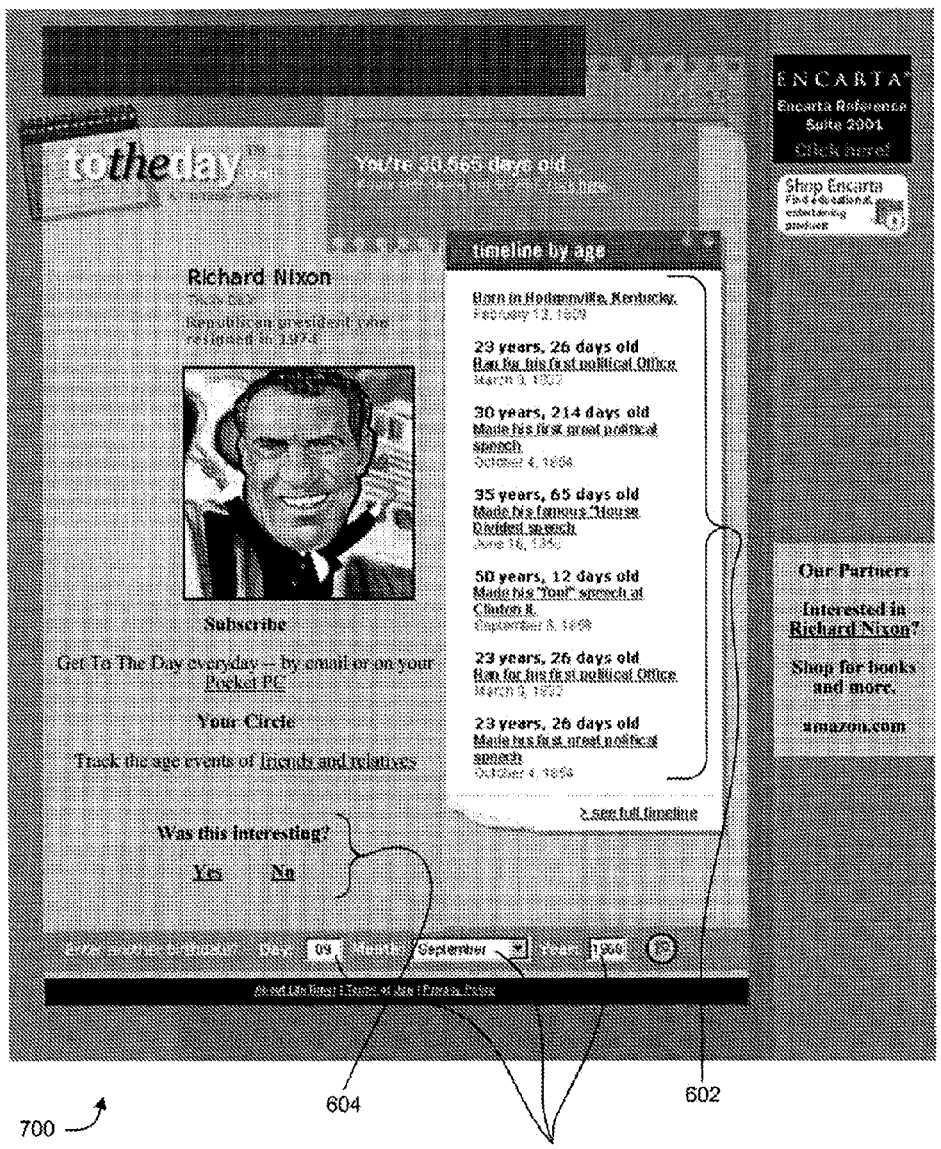
FIG. 7 is an event page with an alternative layout to that shown in FIG. 6.

FIG. 7 is an event page 700 with an alternative layout to that shown in FIG. 6. The event page 700 can include date of birth fields 706, similar to the fields 502 shown and described in FIG. 5. The event page 700 can also include the feedback section 604. The feedback section 604 allows the user to select whether the article or description of the event was interesting.

Figure 8:
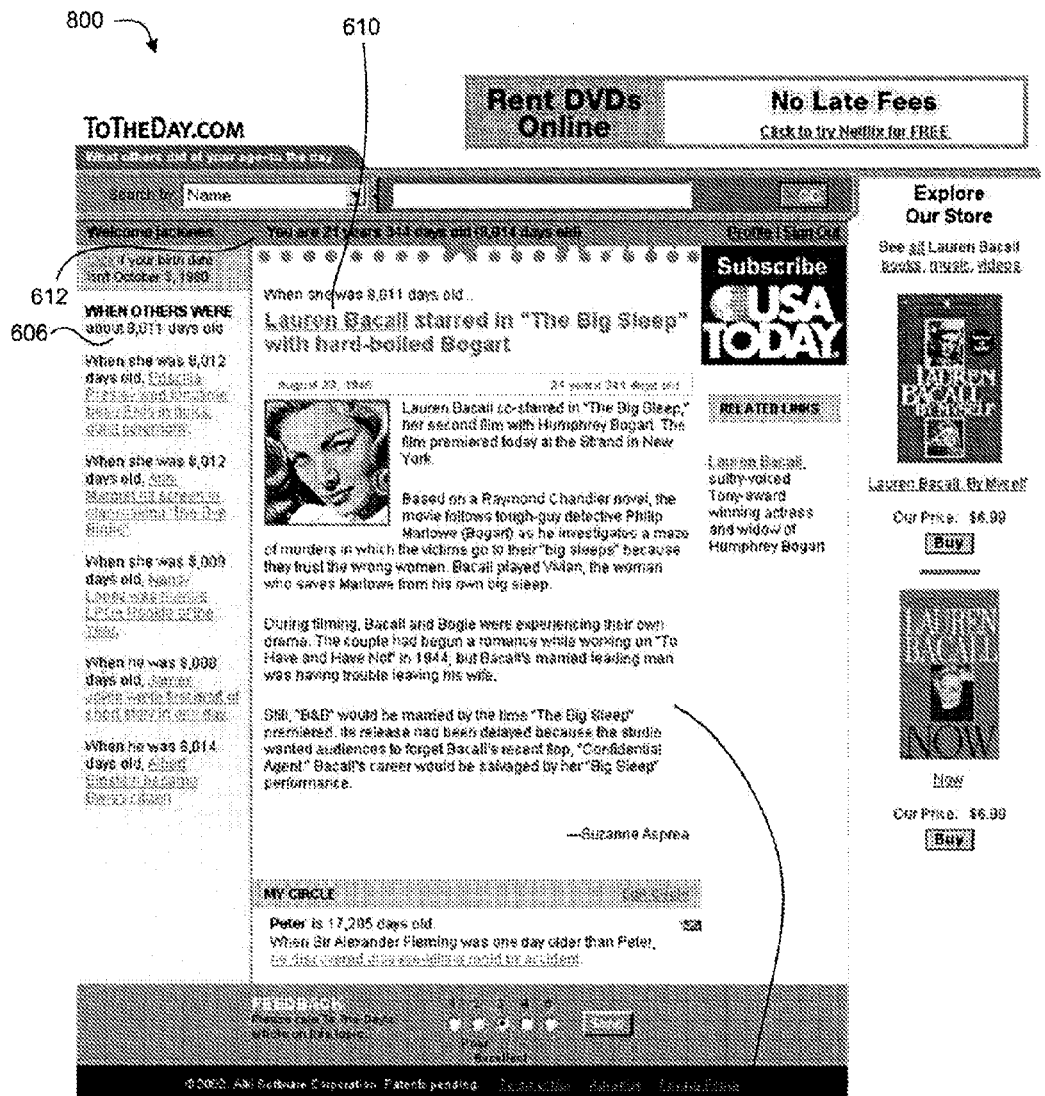
FIG. 8 is an example of an event page displayed when an event is not available for the exact age of the user.

FIG. 8 is an example of an event page 800 displayed when an event is not available for the exact age of the user. The event page 800 includes the display portion 602 describing an event or an accomplishment of a notable person at an age proximate to the exact age of the user. In other embodiments, a projected event can be used, such as an event that occurred in the life of a notable person when the notable person was exactly 25 years older than the user. In additional embodiments, a survival anniversary can be used, such as the death of a notable person when the notable person was exactly 10 years younger than the user. In further embodiments, the event can be a common behavior/feature at of a person the exact age of the user, such as graduating from college.

Figure 9:
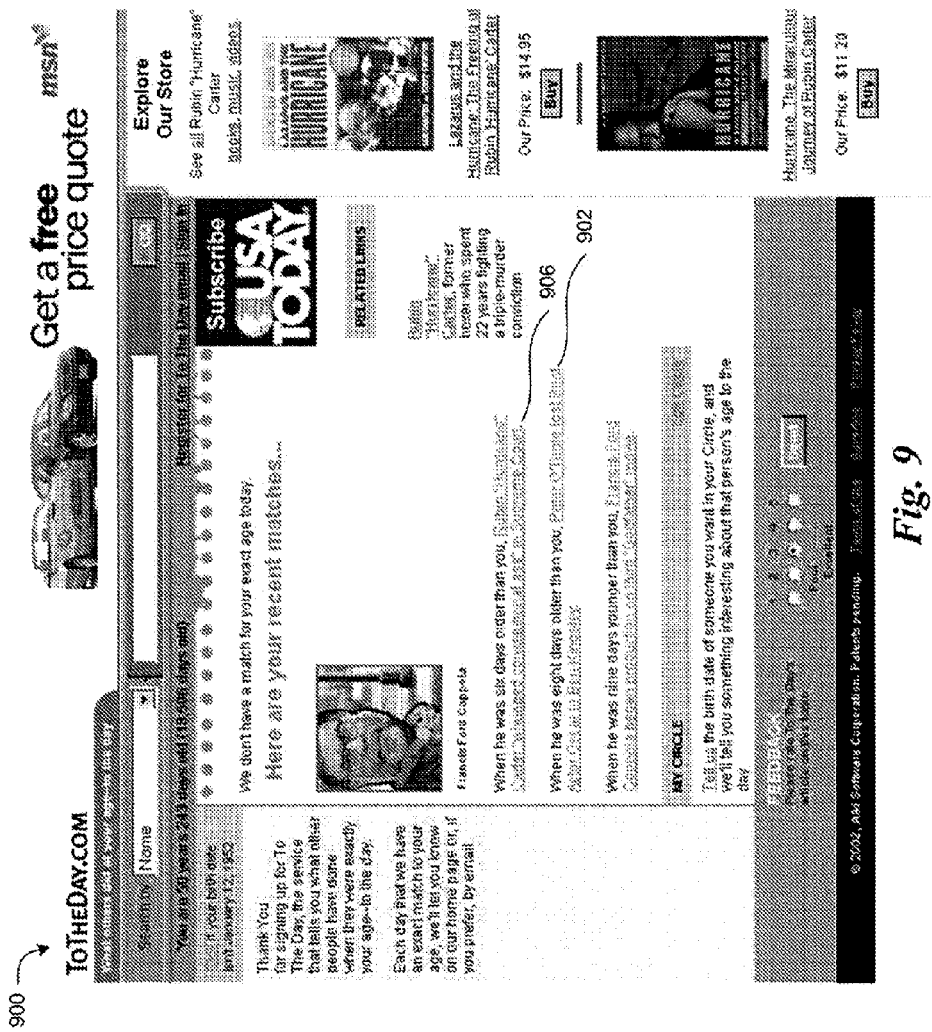
FIG. 9 is an event page with an alternative layout to that shown in FIG. 8.

FIG. 9 is an event page 900 with an alternative layout to that shown in FIG. 8. When an event is not available for the exact age of the user, the event page 900 can display various related events that occurred at ages proximate to the exact age of the user. For example, the event page 900 displays three events 902 with links 906 to each particular event.

Figure 10:
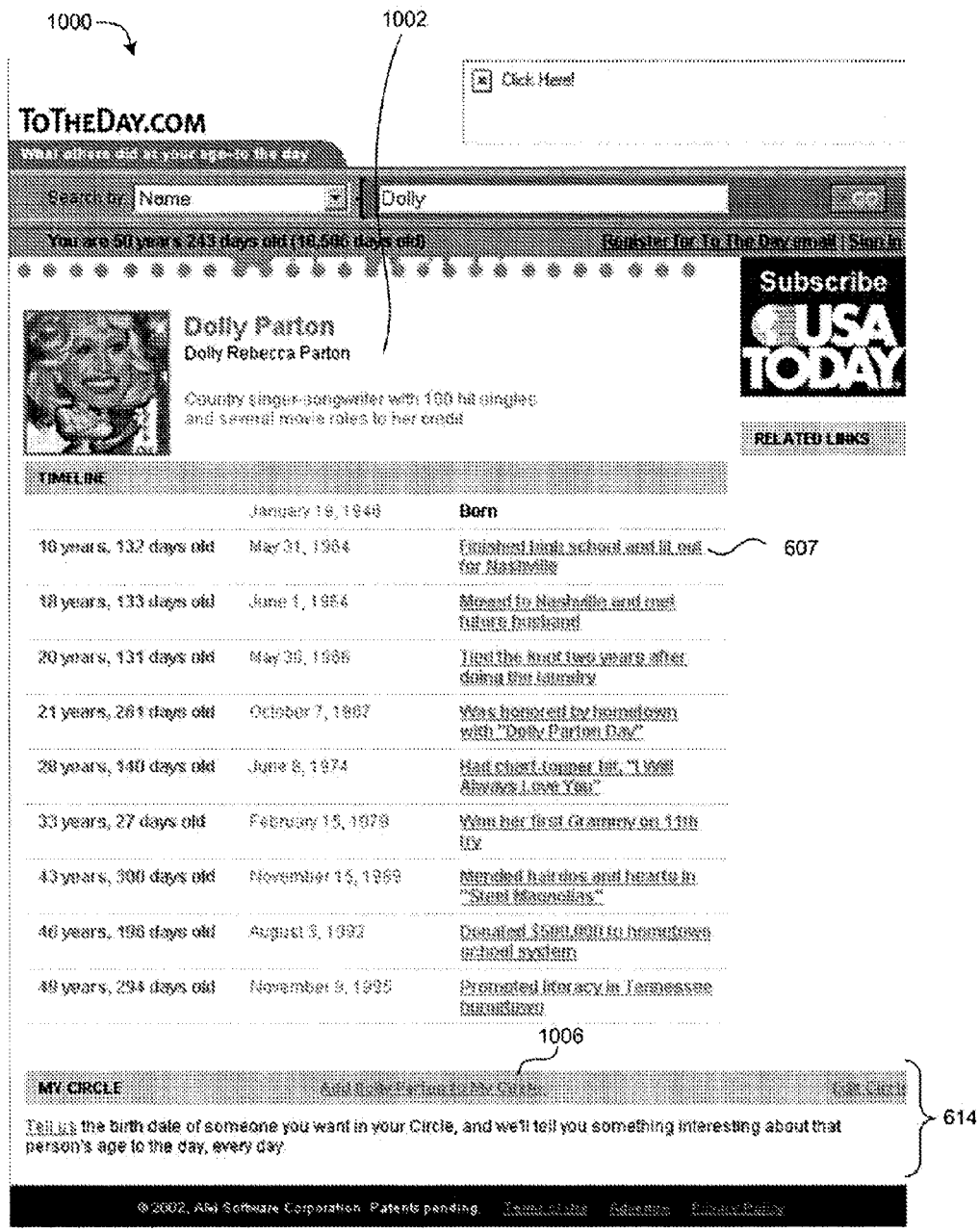
FIG. 10 is an example of a timeline/ageline page detailing different events in the life of a particular person.

FIG. 10 is an example of a timeline/ageline page 1000 detailing different events in the life of a particular person. This kind of timeline is an "ageline" because it is organized by the age of the person involved in addition to the date on which events occurred. The timeline/ageline page 1000 includes a timeline/ageline 1002 listing the events, the exact age of the person when each of the events occurred, and the date of each of the events. Each event can contain the link 607 to a full description of the event (event description field 416), such as that shown in FIGS. 6 and 8. The timeline/ageline 1002 contains all the events cataloged in the database that are associated with the person. Thus, the server queries the database 210 for all records associated with a particular person field 404, retrieves such records, and creates a display page chronologically listing the age in days field 402, date of event field 414 and headline fields 406 as shown. (In a like manner, the server can create similar display pages based on database queries associated with any of the fields of a record.) The timeline/ageline page 1000 also includes a link 1006 to add the particular person to the user's My Circle 614. The user may then receive information regarding the selected person, when there is data available for the day-age of the person in the circle. In the rare case where the person in the circle is exactly the same age as the user, the same material would be presented about the circle member as is presented about the user. For example, if the person in the circle happens to be 18,944 days old on the day that the feature is used, information corresponding the age 18,944 days will be presented.

Further, the server computer could create or format a page or screen to display multiple luminaries and associated accomplishments to align their agelines and view a vertical cross-section of what these luminaries did at various points in their lives as compared to each other. Thus, a user could ask the server computer to display a list of what 5 famous poets did during the Christmas season of their $28^{th}$ year.

Figure 11:
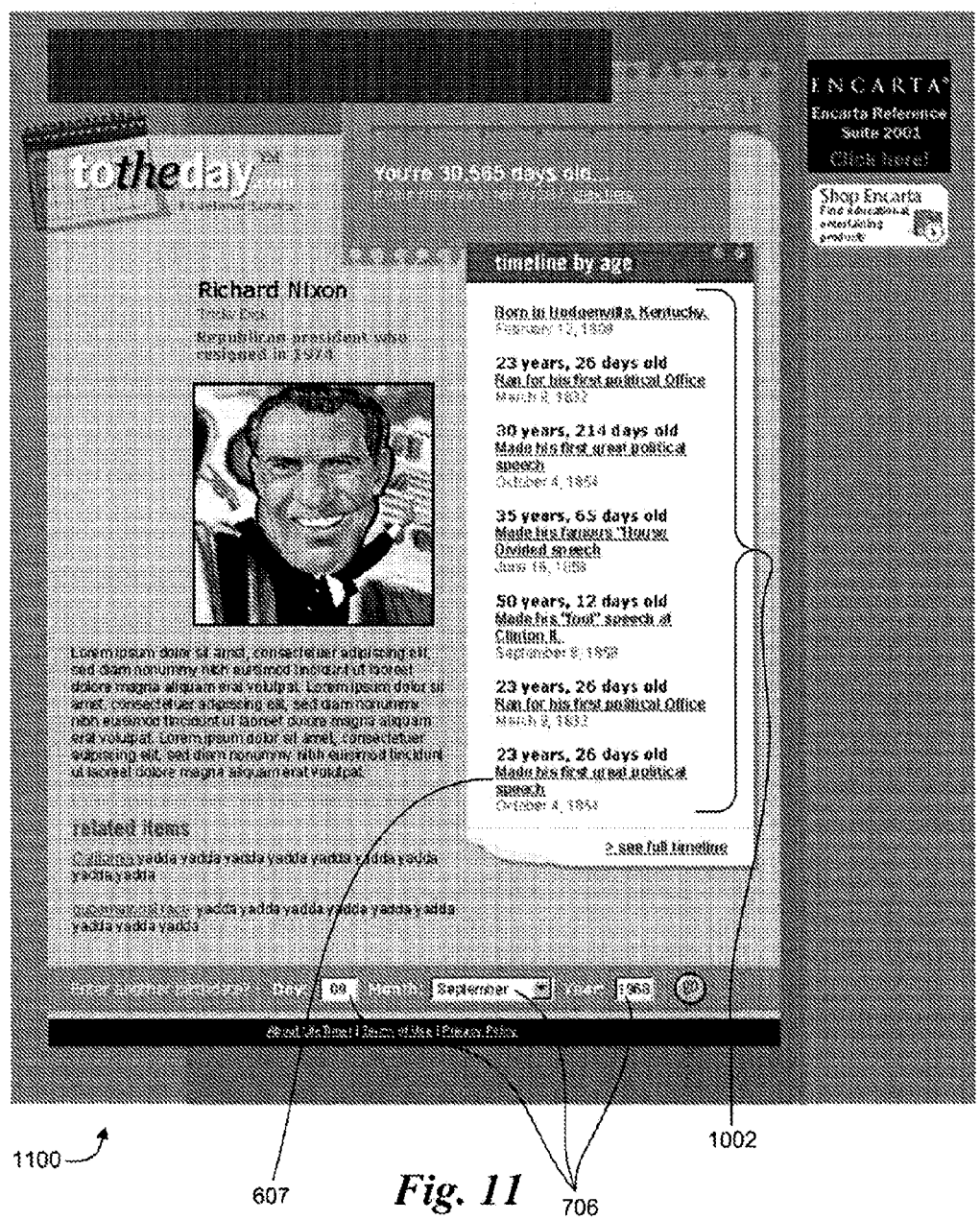
FIG. 11 is a timeline/ageline page with an alternative layout to that shown in FIG. 10.

FIG. 11 is a timeline/ageline page 1100 with an alternate layout to that shown in FIG. 10. In this layout, the timeline/ageline page 1100 also includes the date of birth fields 706.

Figure 12:
FIG. 12 is a MSN home page that includes a TOTHEDAY portion.

FIG. 12 is a MSN home page 1200 that includes many self-explanatory portions. Importantly, the page 1200 includes a TOTHEDAY section 1202 that can be customized to display events associated with the exact age of the user. The user customizes the TOTHEDAY section 1202 by inputting his or her date of birth in a process similar to that described above with reference to FIG. 5. In subsequent visits to the home page 1200, the exact age of the user can be ascertained from a cookie placed on the user's computer 100, or, alternatively, by the user re-entering his or her date of birth or exact age, or by logging into a registration system that associates a login with a date of birth. Accordingly, the TOTHEDAY section 1202 includes a description of an accomplishment or an event 1204 that occurred in the life of a notable person when he or she was the exact age or close to the exact age of the user. The event 1204 can include a link 1206 that allows the user to read more about the event 1204. The link could be associated with information on the MSN web site, the TOTHEDAY web site, or the site of a third party which might or might not have a commercial relationship with the provider of the TOTHEDAY service. The event 1204 can also include another link 1212 which allows the user to view a timeline/ageline of events in the life of the person. The TOTHEDAY section 1202 also includes an age portion 1208 displaying the exact age of the user. The age portion 1208 can include a link 1210 that allows the user to correct the date of birth if the age is inaccurate.

Figure 13:
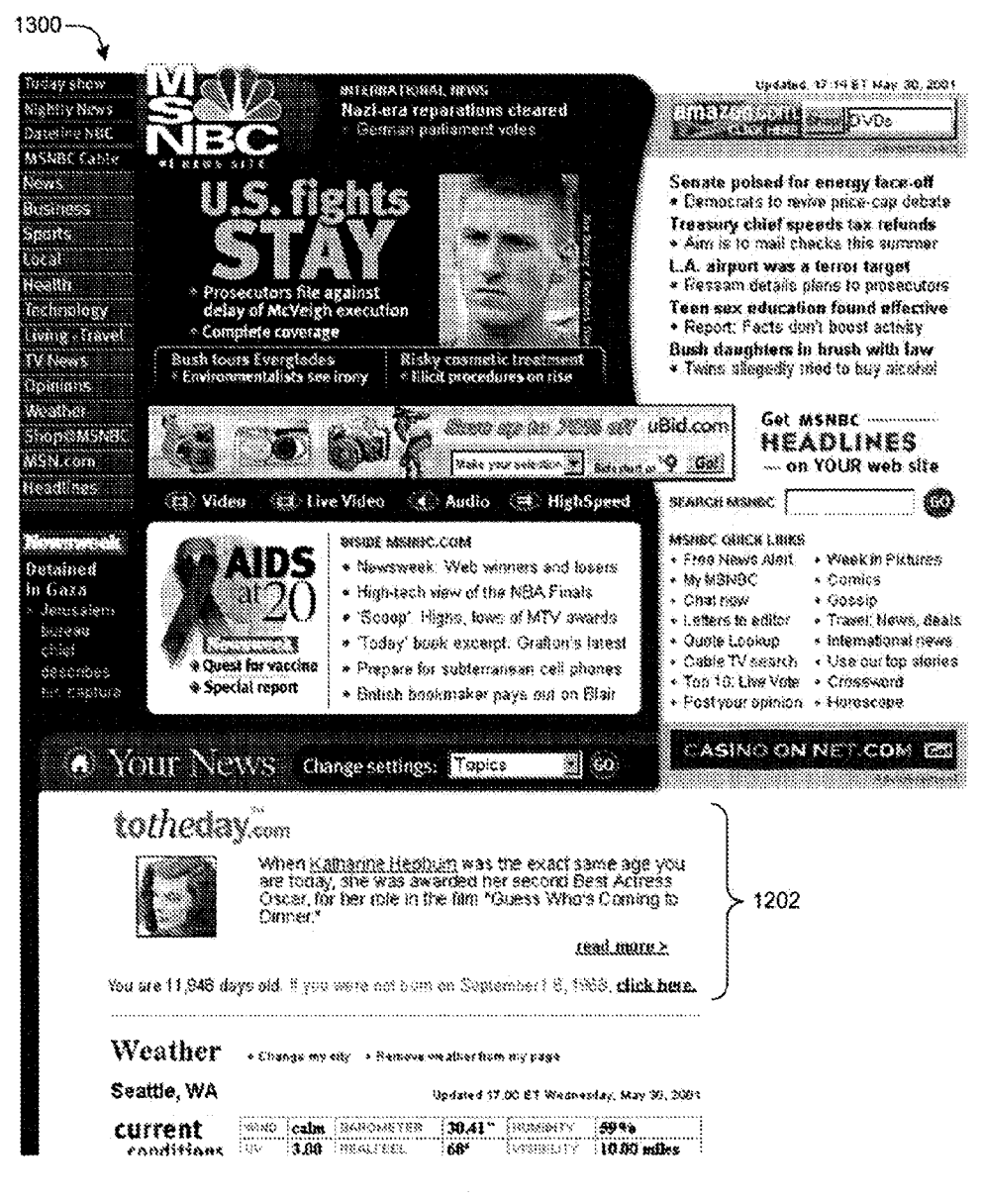

FIG. 13 is a MSNBC home page 1300 that includes self-explanatory portions. Importantly, the home page 1300 includes the TOTHEDAY section 1202 that can be customized to display events associated with the exact age of the user.

FIG. 14 is an Encarta home page 1400 that includes self-explanatory portions. Importantly, the home page 1400 includes the TOTHEDAY section 1202 that can be customized to display events associated with the exact age of the user.

Figure 15:
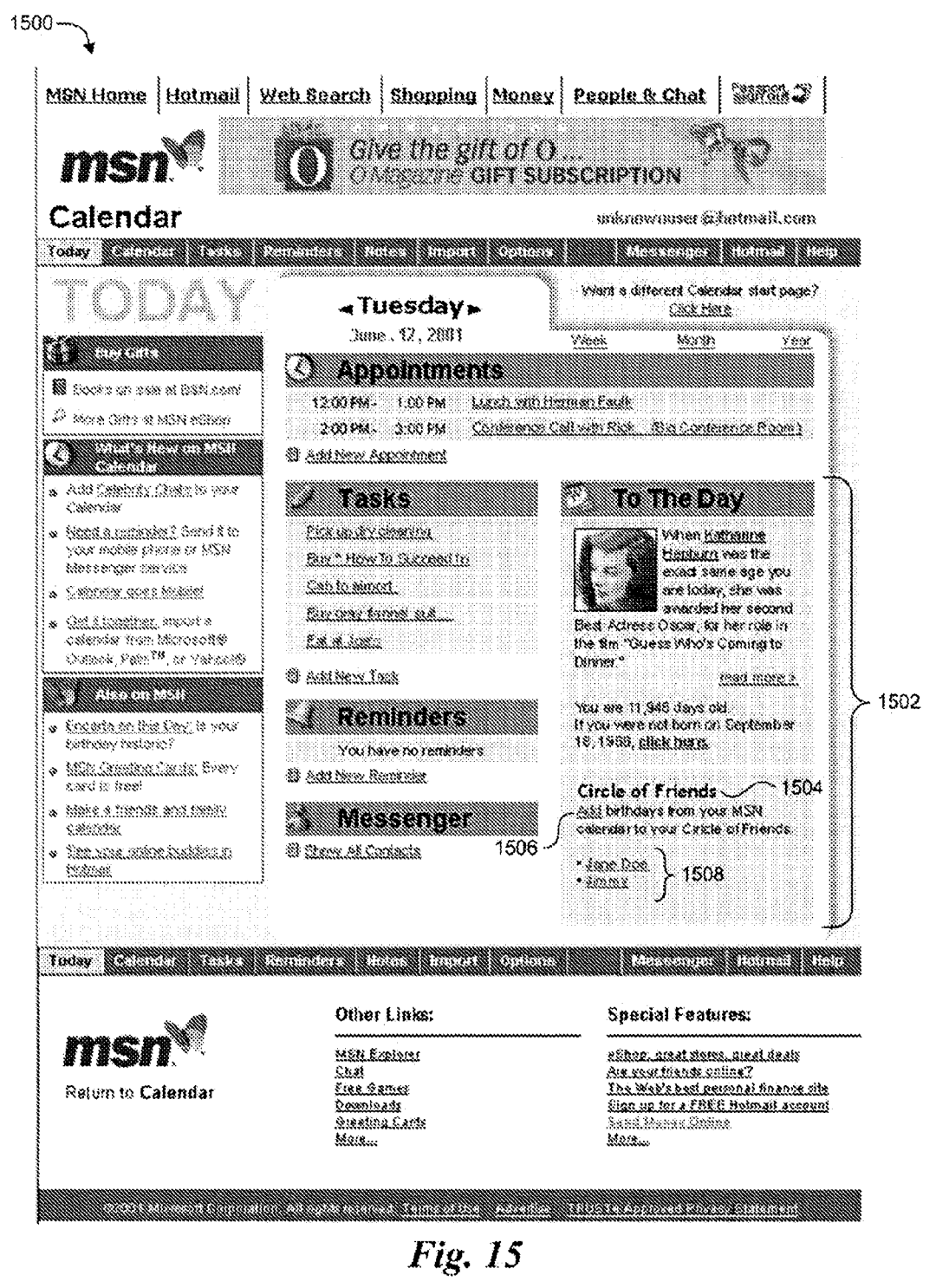

FIG. 15 is a MSN Calendar page 1500 that includes self-explanatory portions. Importantly, the calendar page 1500 includes a TOTHEDAY section 1502 that can be customized to display events associated with the exact age of the user. The TOTHEDAY section 1502 can also include a My Circle (called "Circle of Friends" in this example) section 1504 that allows the user to add friends to a list 1508, and view events associated with the exact age of each friend. Each friend's name contains a link to an event associated with the exact age of the friend. Friends can be added through a link 1506 by entering the friend's name and date of birth.

Figure 16:
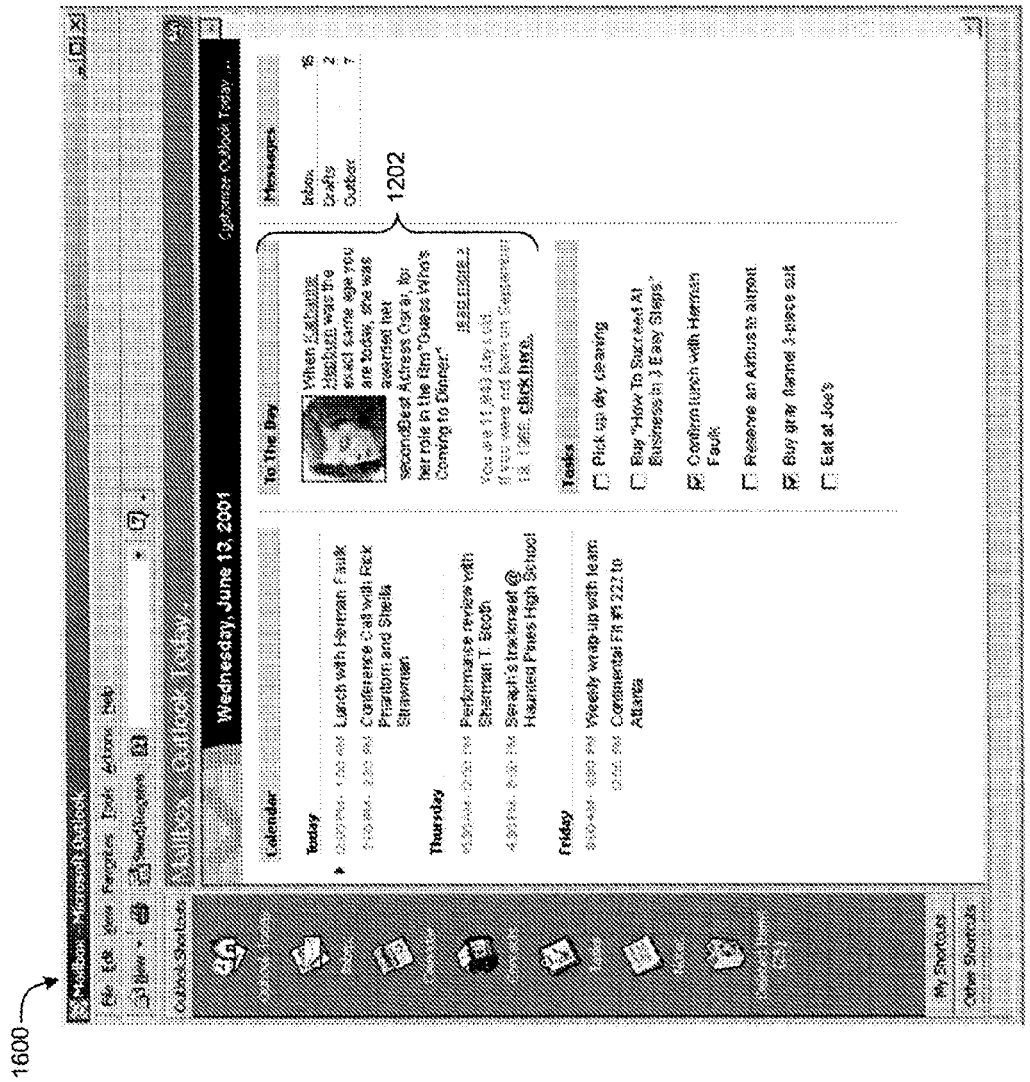
FIG. 16 is a Microsoft Outlook client display that includes the TOTHEDAY portion.

FIG. 16 is a Microsoft Outlook client display 1600 that includes self-explanatory portions. Importantly, the Outlook display 1600 includes the TOTHEDAY section 1202 that can be customized to display events associated with the exact age of the user.

Figure 17:
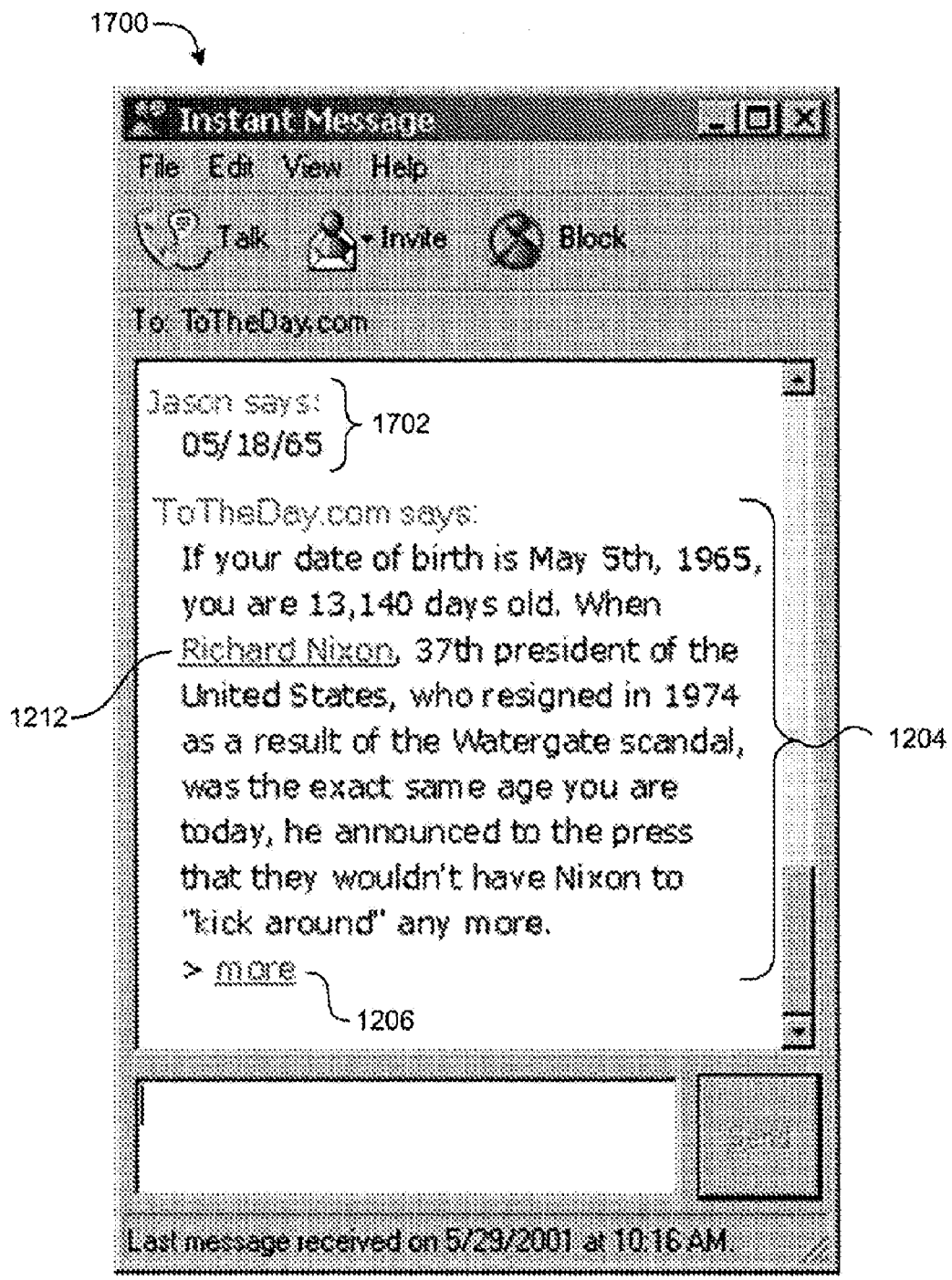
FIG. 17 is a MSN Instant Messenger display that includes the TOTHEDAY portion.

FIG. 17 is a MSN Instant Messenger display 1700 that includes self-explanatory portions. Importantly, the display 1700 includes an instant message 1702 from the user providing the date of birth of the user and an instant message from a server providing the event 1204 associated with the user's exact age.

Figure 18:
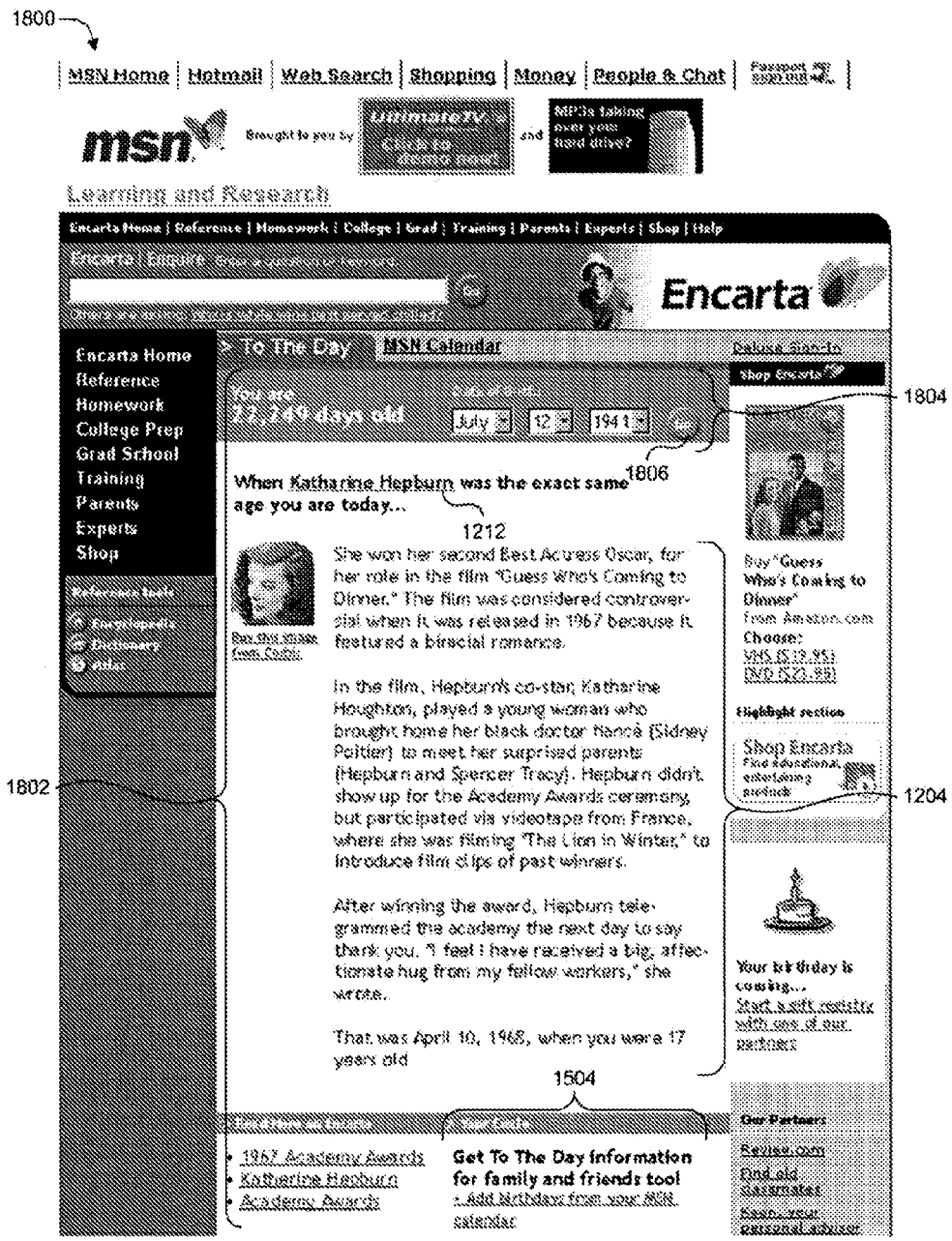
FIG. 18 is an Encarta page enhanced with TOTHEDAY content about the user.

FIG. 18 is an Encarta page 1800 enhanced with TOTHEDAY content about the user. The page 1800 includes self-explanatory portions, and importantly, a TOTHEDAY section 1802 that can be customized to display events associated with the exact age of the user. The TOTHEDAY section 1802 can include date of birth fields 1804, similar to those shown in FIG. 7. The date of birth fields 1804 can include drop-down menus to select the day, month and year that the user was born. The user can then press a GO button 1806 to send the data and customize the event 1204 to the user.

Figure 19:
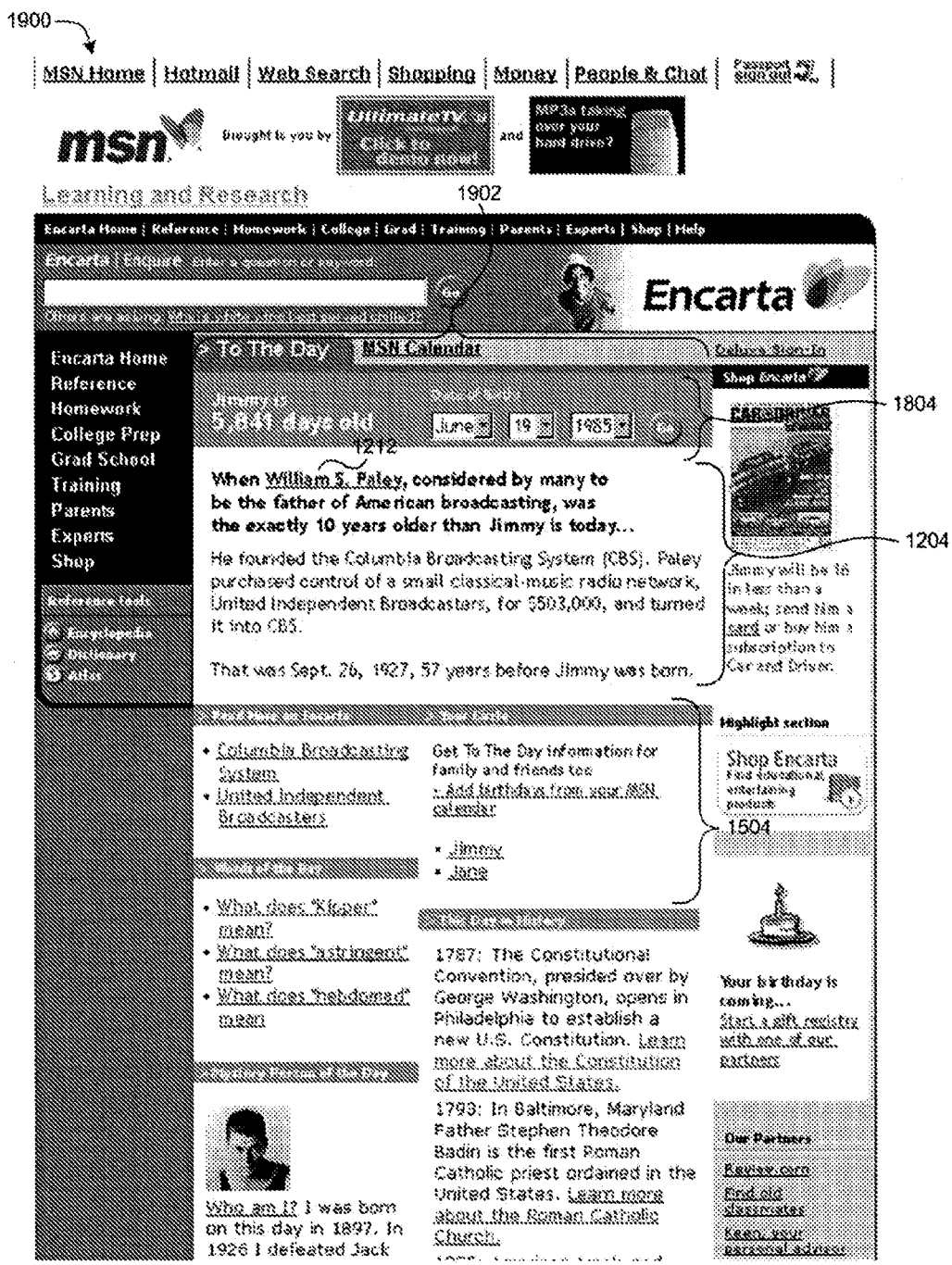
FIG. 19 is an Encarta page enhanced with TOTHEDAY content about a friend of the user.

FIG. 19 is an Encarta page 1900 enhanced with TOTHEDAY content about a friend of the user. The page 1900 includes self-explanatory portions, and importantly, a TOTHEDAY section 1902 that can be customized to display the event 1204 associated with the exact age of the friend.

Figure 20:
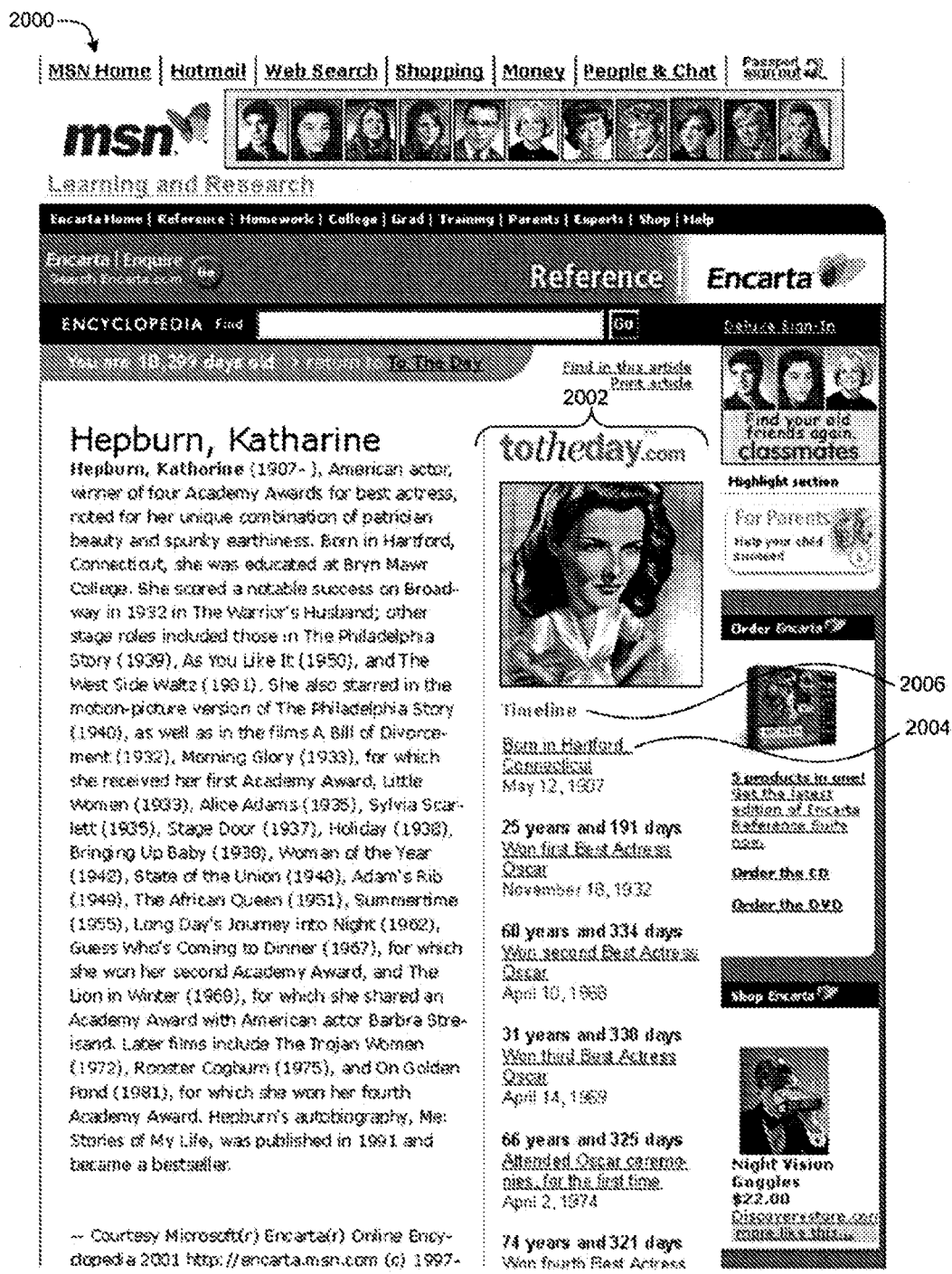
FIG. 20 is an Encarta biography page enhanced with TOTHEDAY content.

FIG. 20 is an Encarta biography page 2000 enhanced with TOTHEDAY content. The page 2000 includes self-explanatory portions, and importantly, a TOTHEDAY section 2002 that includes a timeline/ageline 2006 of events in the life of the person referenced in the Encarta biography. The timeline/ageline 2006 in the TOTHEDAY section 2002 includes specific events 2004 listed with the age at which each event occurred. Each event 2004 may include a link to a full description of the event.

Figure 21:
FIG. 21 is an Encarta article page about a general topic that can be linked too from the TOTHEDAY web site.

FIG. 21 is an Encarta article page 2100 about a general topic that can be linked to from the TOTHEDAY feature or web site.

Figure 22:
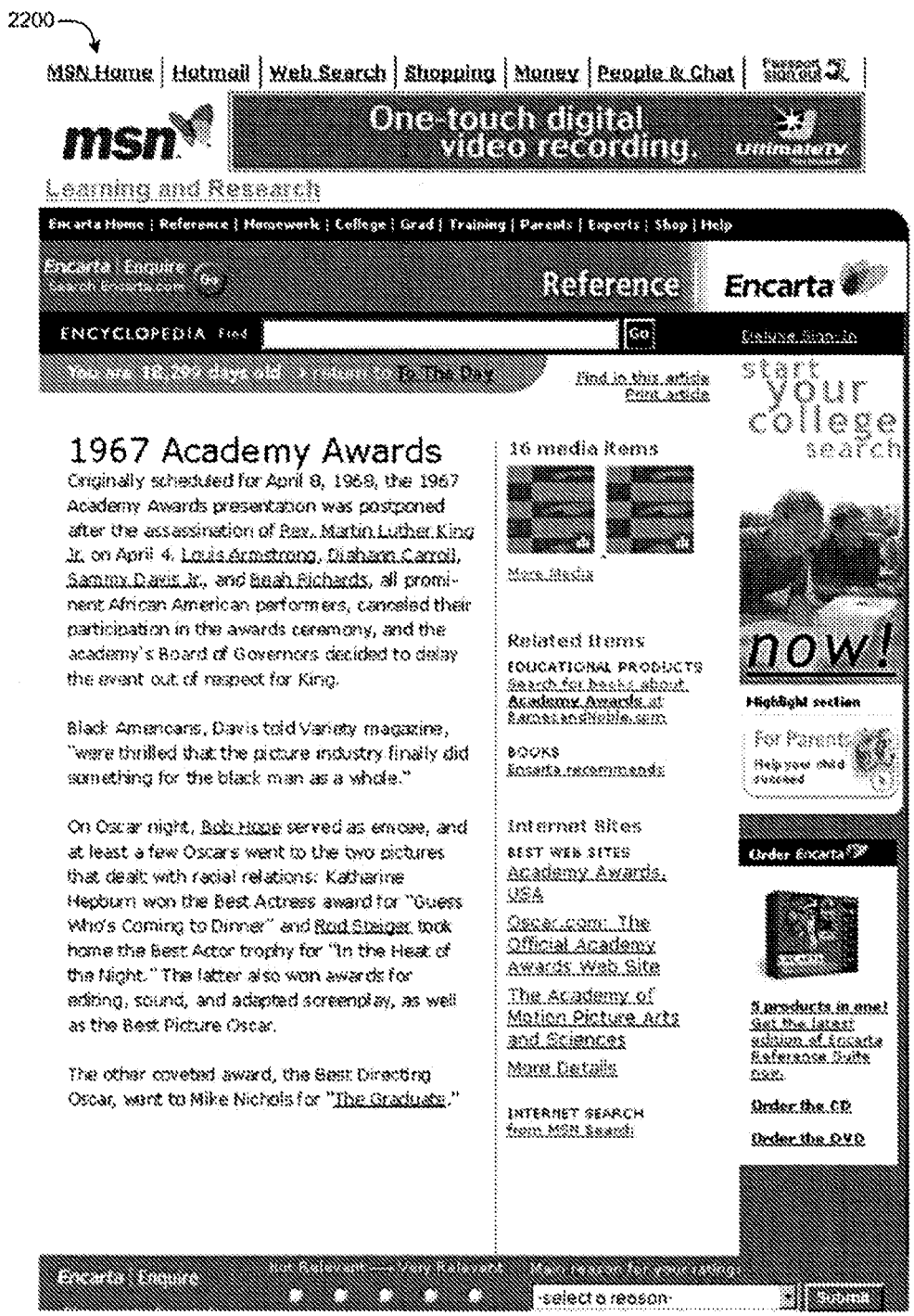
FIG. 22 is an Encarta article page about a specific event that can be linked to from the TOTHEDAY web site.

FIG. 22 is an Encarta article page 2200 about a specific event that can be linked to from the TOTHEDAY feature or web site.

Figure 23:
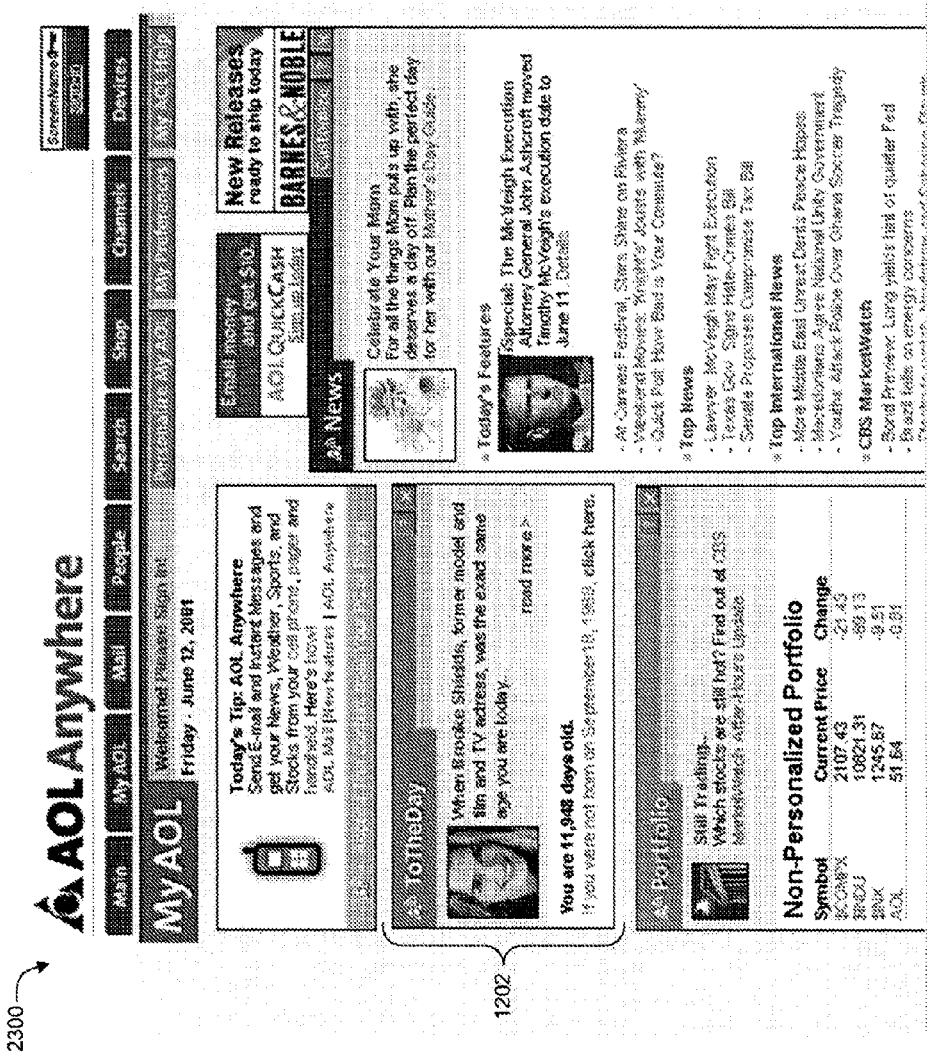
FIG. 23 is a My AOL home page that includes the TOTHEDAY portion.

FIG. 23 is a My AOL home page 2300 that includes self-explanatory portions. Importantly, the home page 2300 includes the TOTHEDAY section 1202 that can be customized to display events associated with the exact age of the user.

Figure 24:
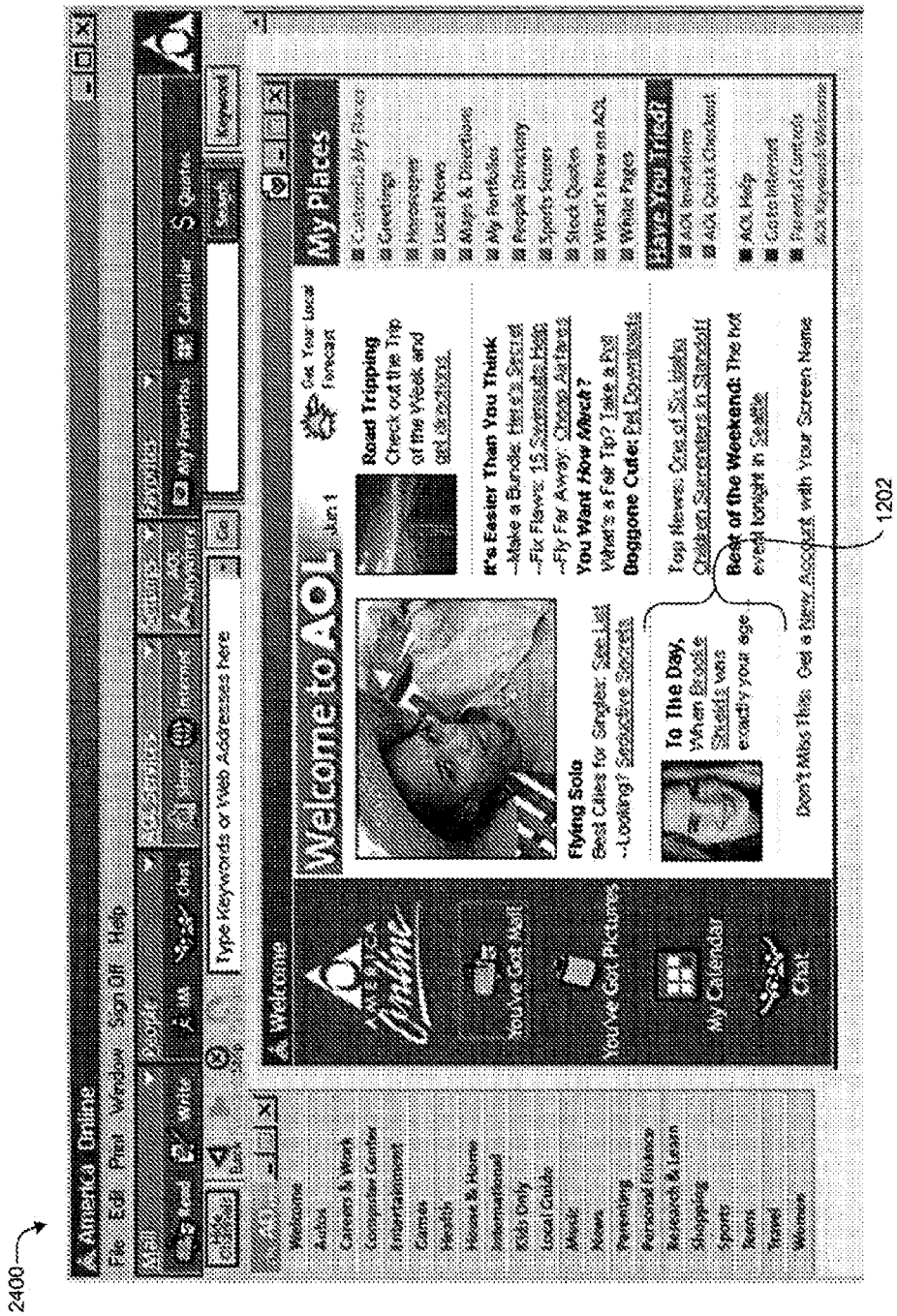
FIG. 24 is an AOL home page that includes the TOTHEDAY portion.

FIG. 24 is an AOL home page 2400 that includes self-explanatory portions. Importantly, the home page 2400 includes the TOTHEDAY section 1202 that can be customized to display events associated with the exact age of the user.

Figure 25:
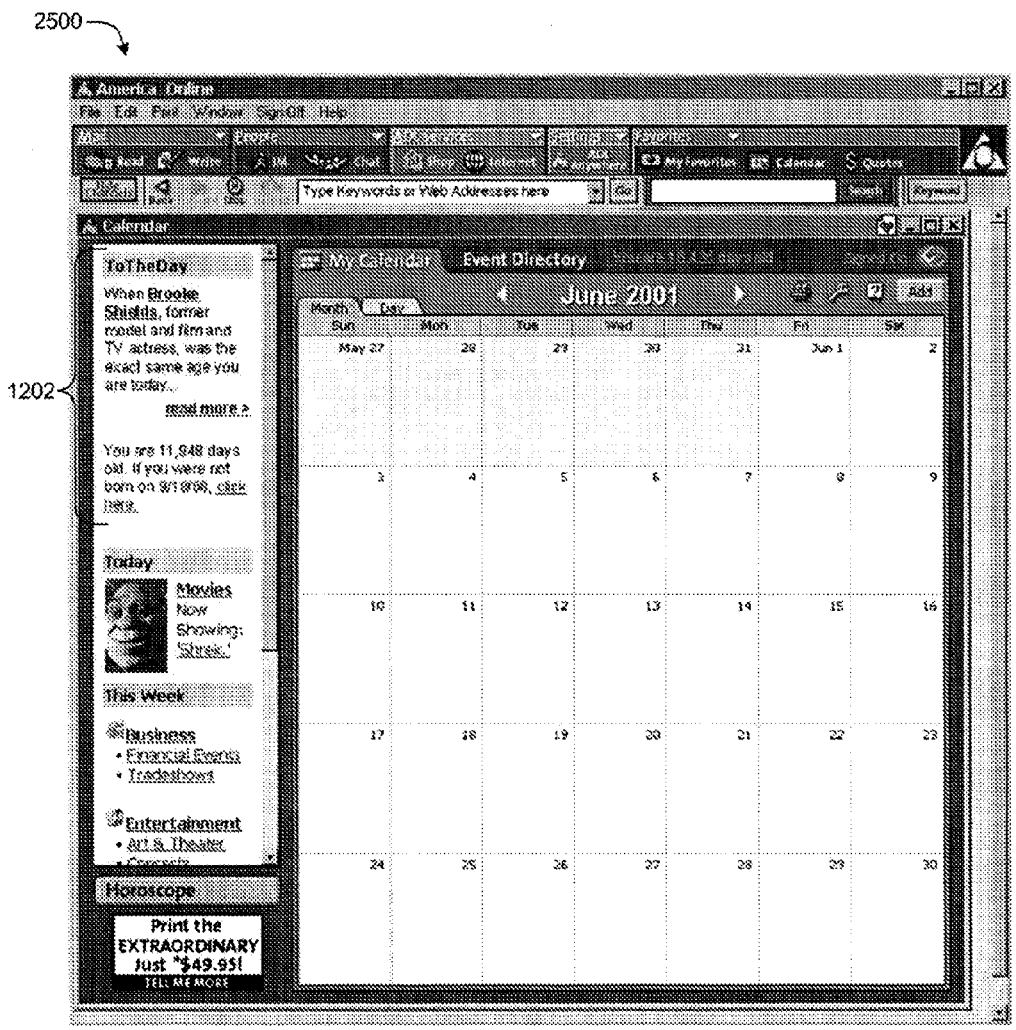
FIG. 25 is an AOL Calendar that includes the TOTHEDAY portion.

FIG. 25 is an AOL Calendar 2500 that includes self-explanatory portions. Importantly, the calendar 2500 includes the TOTHEDAY section 1202 that can be customized to display events associated with the exact age of the user.

FIG. 26 is a My Netscape home page 2600 that includes self-explanatory portions. Importantly, the home page 2600 includes the TOTHEDAY section 1202 that can be customized to display events associated with the exact age of the user.

Figure 27:
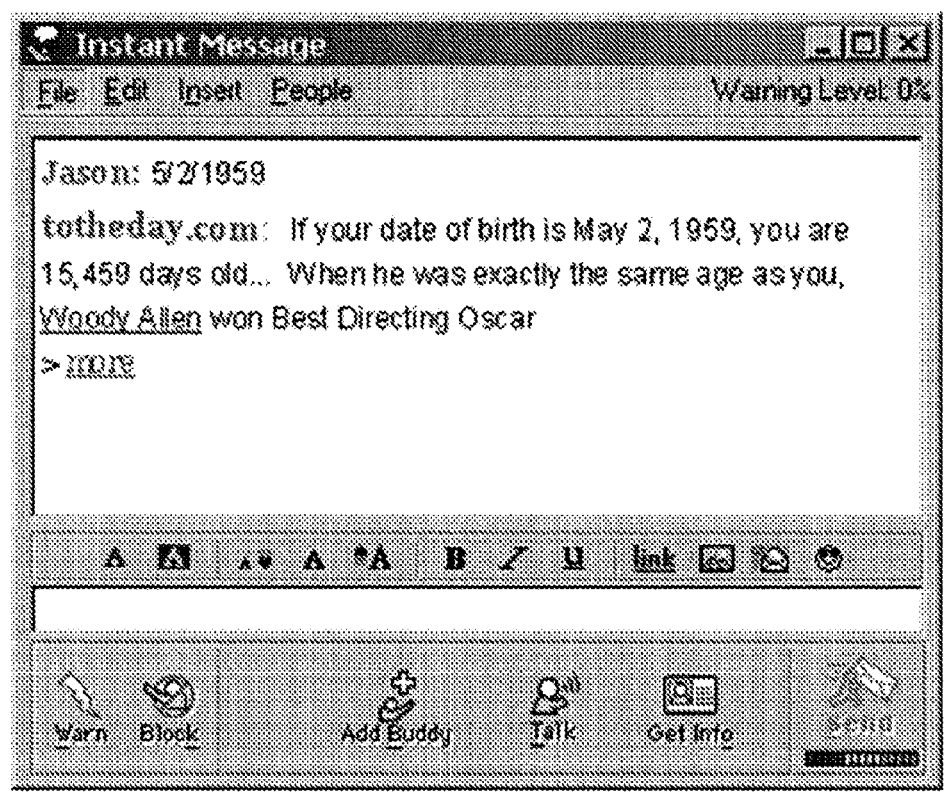
FIG. 27 is an AOL Instant Messenger display that includes the TOTHEDAY portion.

FIG. 27 is an AOL Instant Messenger display 2700 that includes self-explanatory portions. The display 2700 is an alternative layout to that described in FIG. 17.

Figure 28:
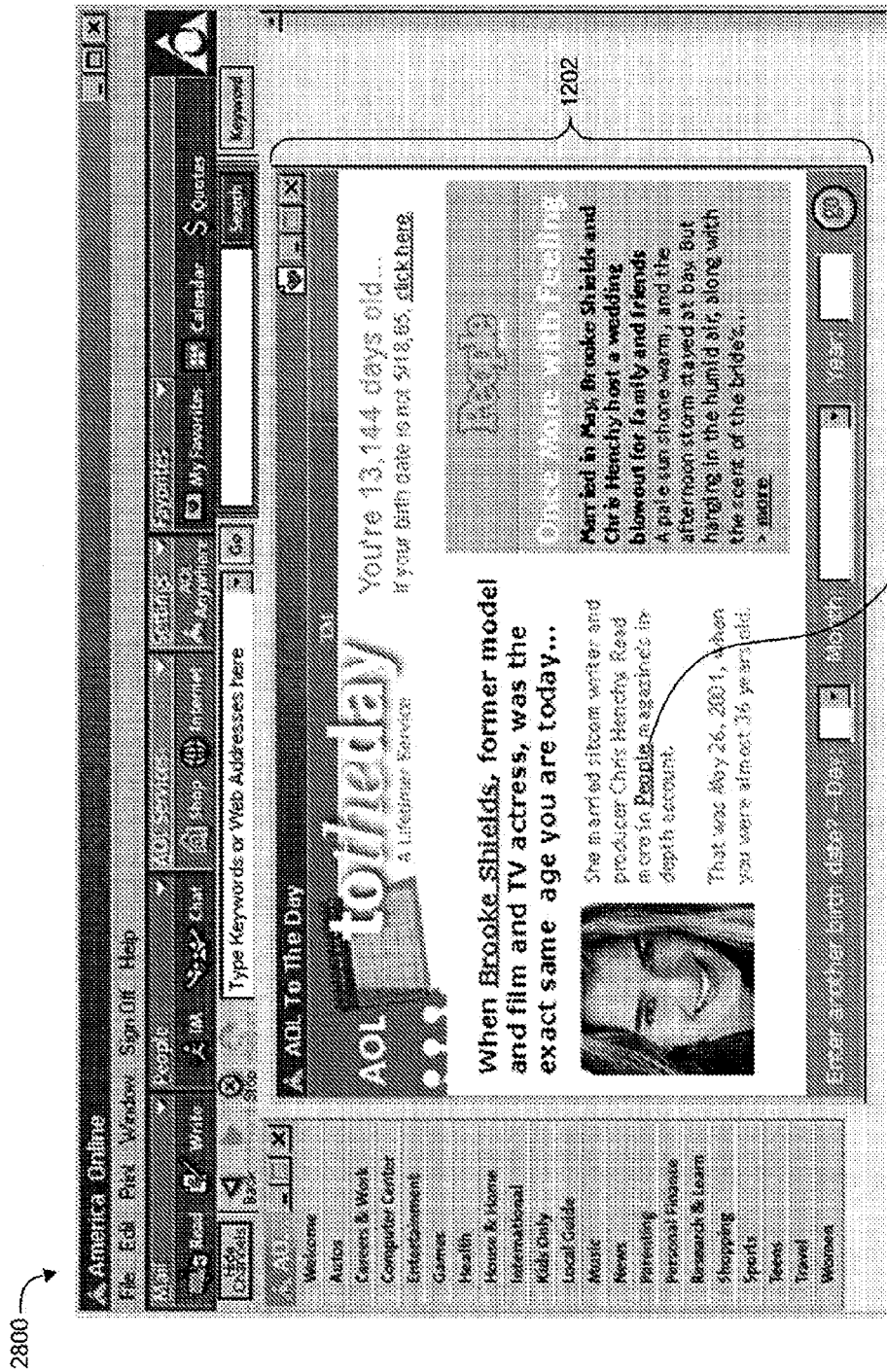
FIG. 28 is an AOL TOTHEDAY page that includes the TOTHEDAY portion.

FIG. 28 is an AOL TOTHEDAY page 2800 that includes self-explanatory portions. Importantly, the page 2800 includes the TOTHEDAY section 1202 that can be customized to display events associated with the exact age of the user. The TOTHEDAY section 1202 includes a link 2802 to a partner site, such as People magazine, that includes information, such as an article, about the individual of interest.

Figure 29:
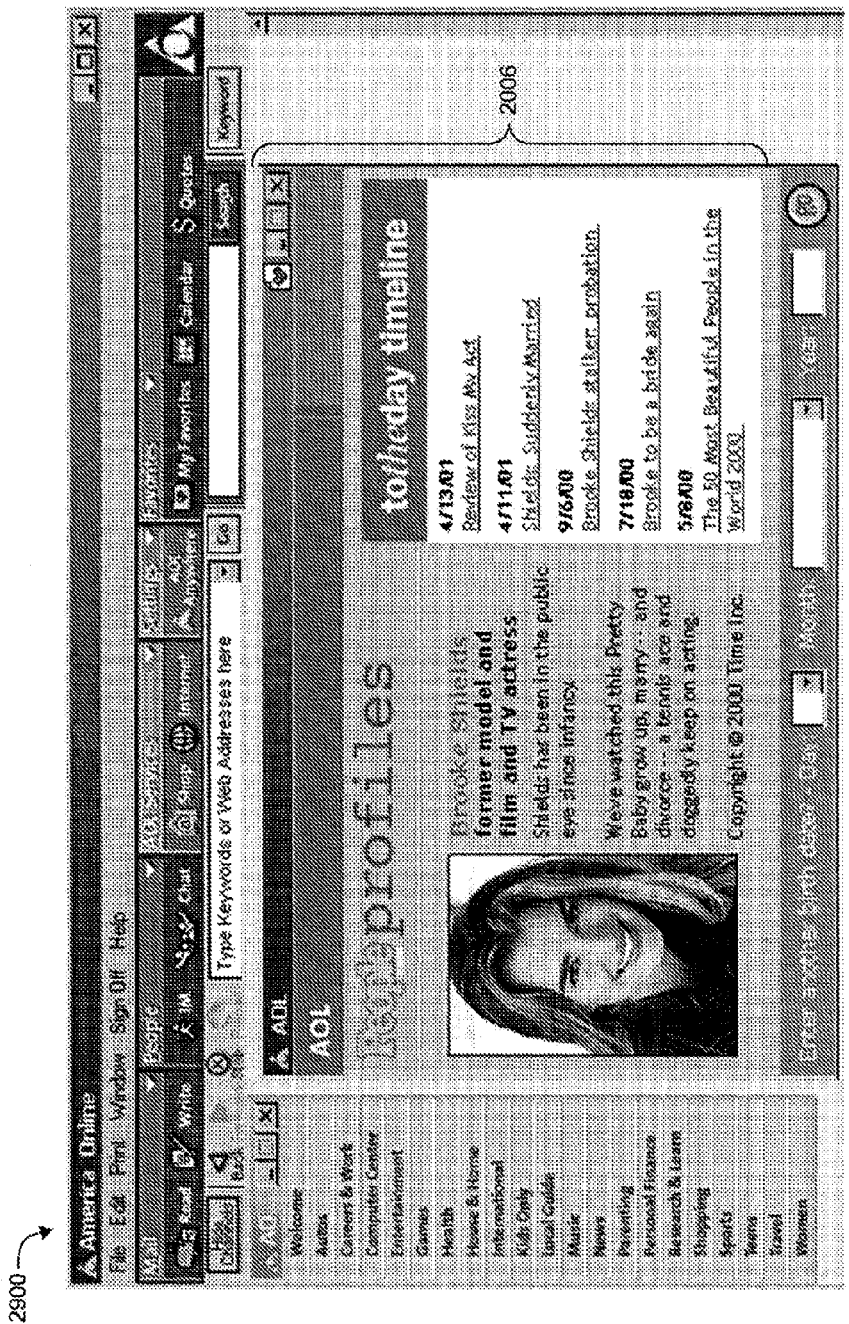
FIG. 29 is an AOL page that includes the TOTHEDAY portion.

FIG. 29 is an AOL page 2900 that includes self-explanatory portions. Importantly, the page 2900 includes the TOTHEDAY timeline/ageline 2006.

FIG. 30 is a My Yahoo home page 3000 that includes self-explanatory portions. Importantly, the home page 3000 includes the TOTHEDAY section 1202 that can be customized to display events associated with the exact age of the user.

Figure 31:
FIG. 31 is a Yahoo Calendar that includes the TOTHEDAY portion.

FIG. 31 is a Yahoo Calendar 3100 that includes self-explanatory portions. Importantly, the calendar 3100 includes the TOTHEDAY section 1202 that can be customized to display events associated with the exact age of the user.

Figure 32:
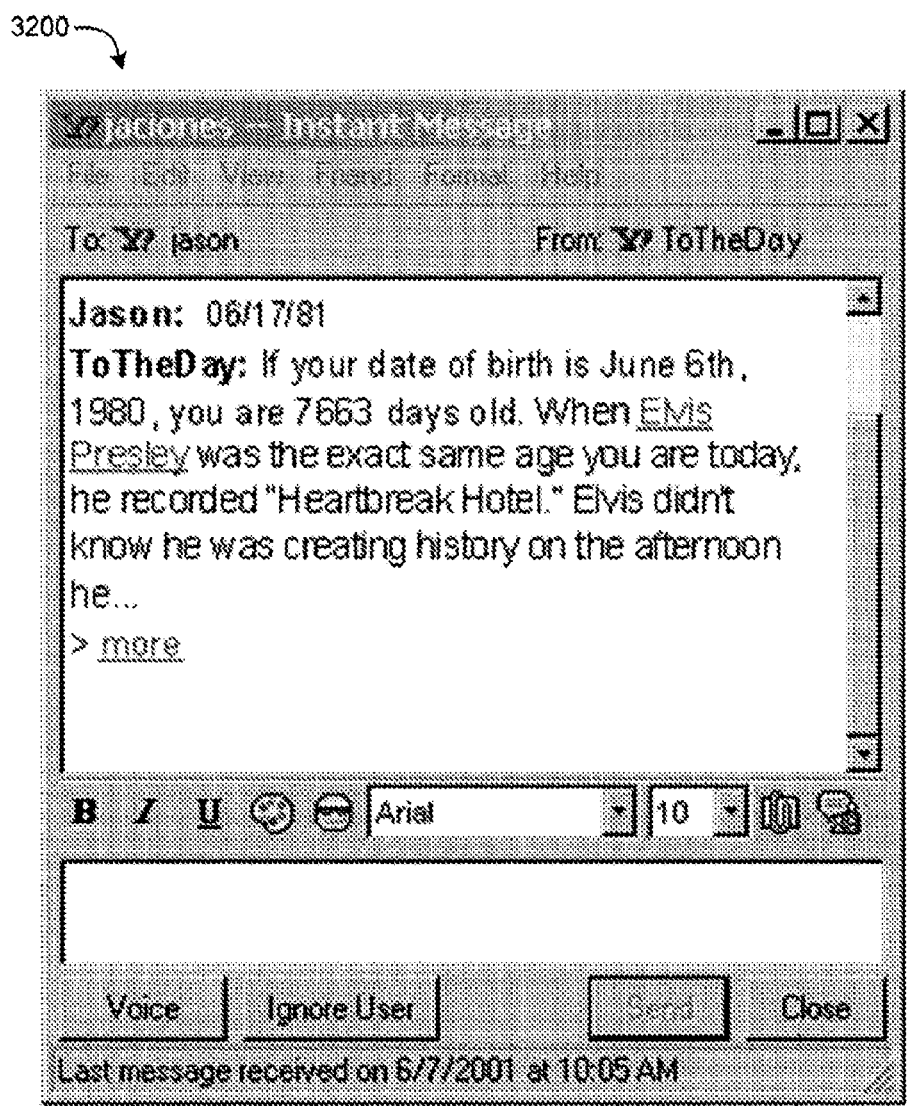
FIG. 32 is a Yahoo Messenger display that includes the TOTHEDAY portion.

FIG. 32 is a Yahoo Messenger display 3200 that includes self-explanatory portions. The display 3200 is an alternative layout to that described in FIG. 17.

Figure 33:
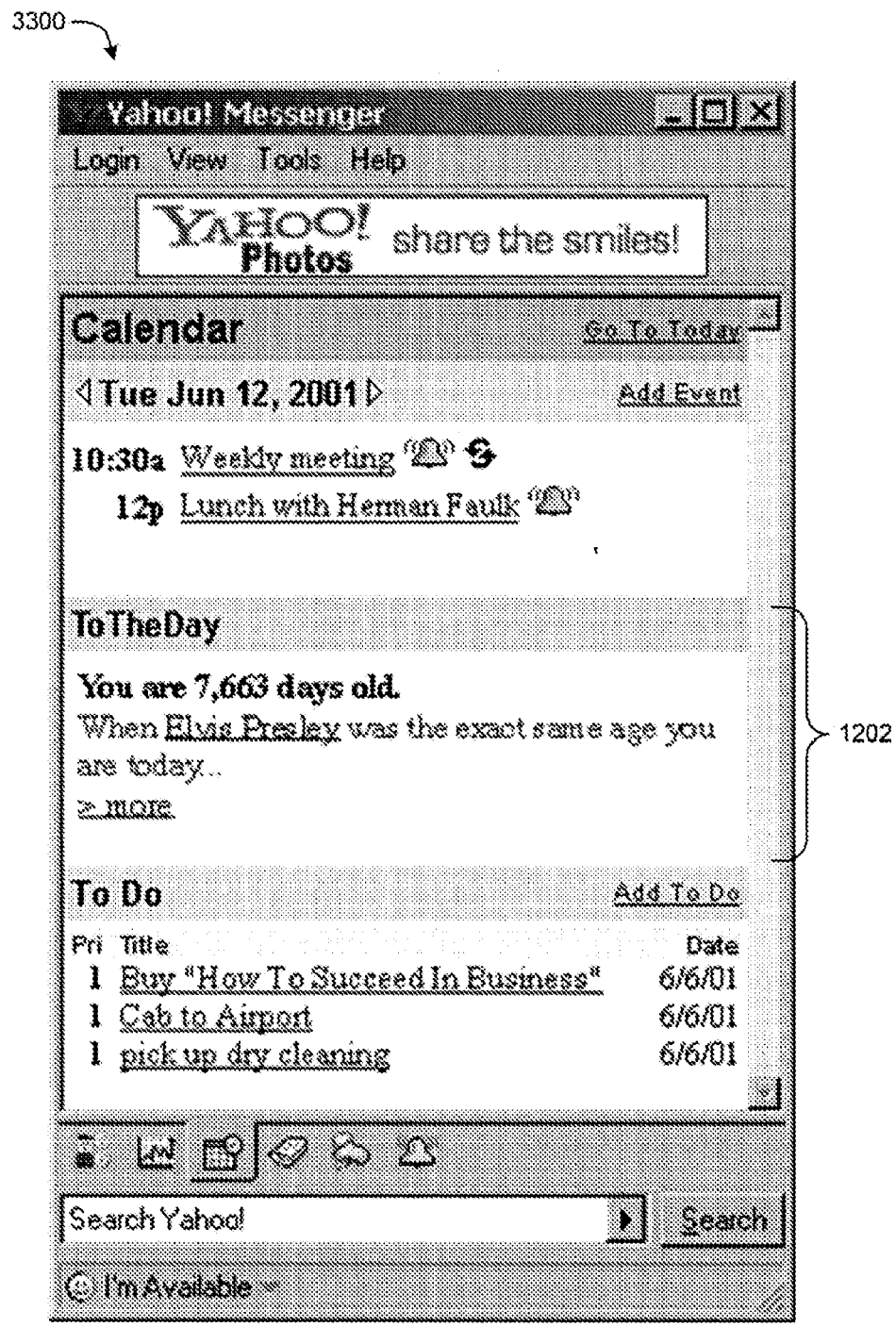
FIG. 33 is a Yahoo Messenger Calendar display that includes the TOTHEDAY portion.

FIG. 33 is a Yahoo Messenger Calendar display 3300 that includes self-explanatory portions. Importantly, the calendar display 3300 includes the TOTHEDAY section 1202 that can be customized to display events associated with the exact age of the user.

Figure 34:
FIG. 34 is a Yahoo TOTHEDAY page that includes the TOTHEDAY portion.

FIG. 34 is a Yahoo TOTHEDAY page 3400 that includes self-explanatory portions. Importantly, the page 3400 includes the TOTHEDAY section 1802 that can be customized to display events associated with the exact age of the user.

Figure 35:
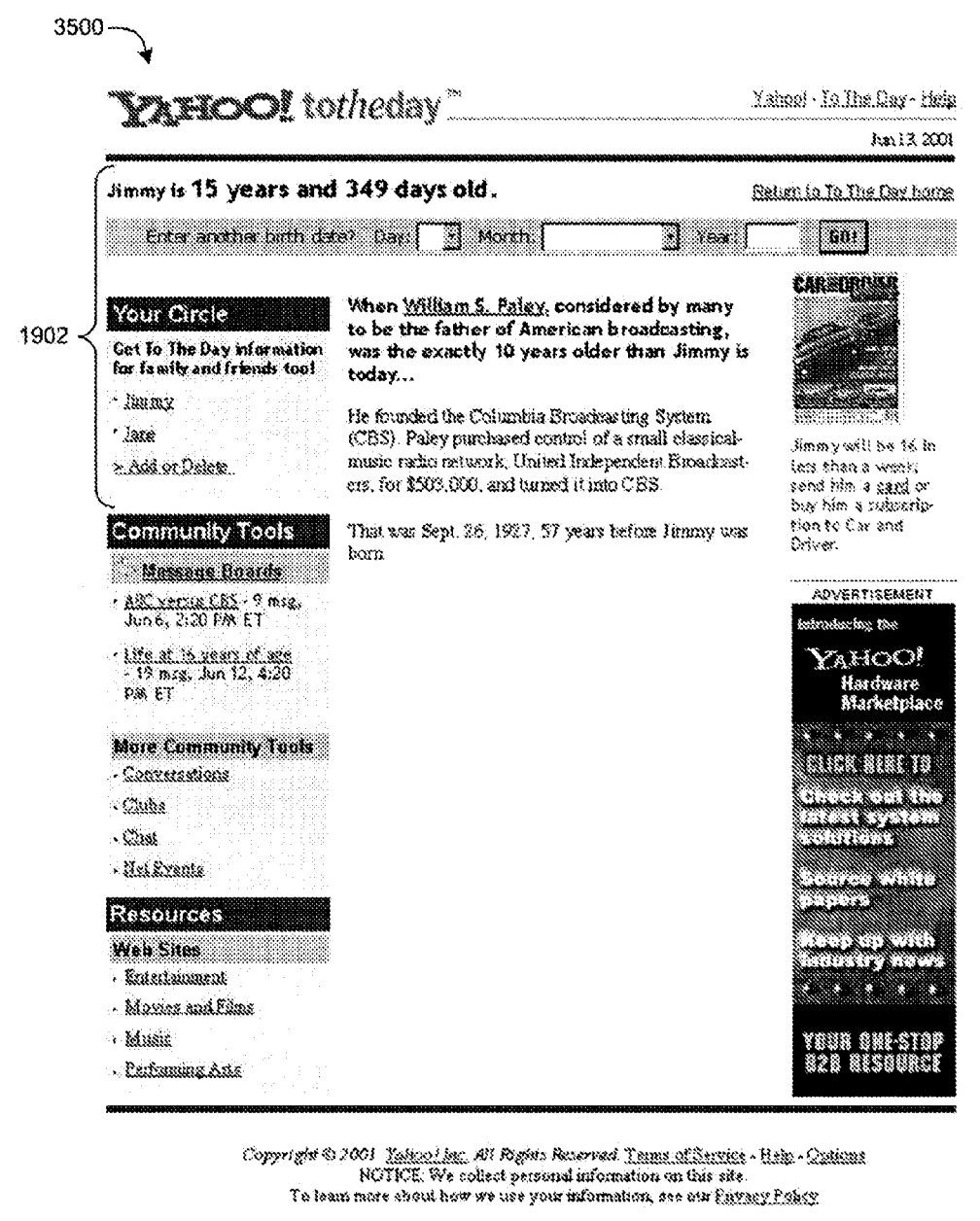

FIG. 35 is a Yahoo TOTHEDAY page 3500 that includes self-explanatory portions. Importantly, the page 3500 includes the TOTHEDAY section 1902 that can be customized to display events associated with the exact age of the user's friend.

Figure 36:
FIG. 36 is a Yahoo TOTHEDAY page that includes the TOTHEDAY portion.

FIG. 36 is a Yahoo TOTHEDAY page 3600 that includes self-explanatory portions. Importantly, the page 3600 includes the TOTHEDAY section 2002 that includes the timeline/ageline 2006 for the person referenced in the Yahoo biography.

Figure 37:
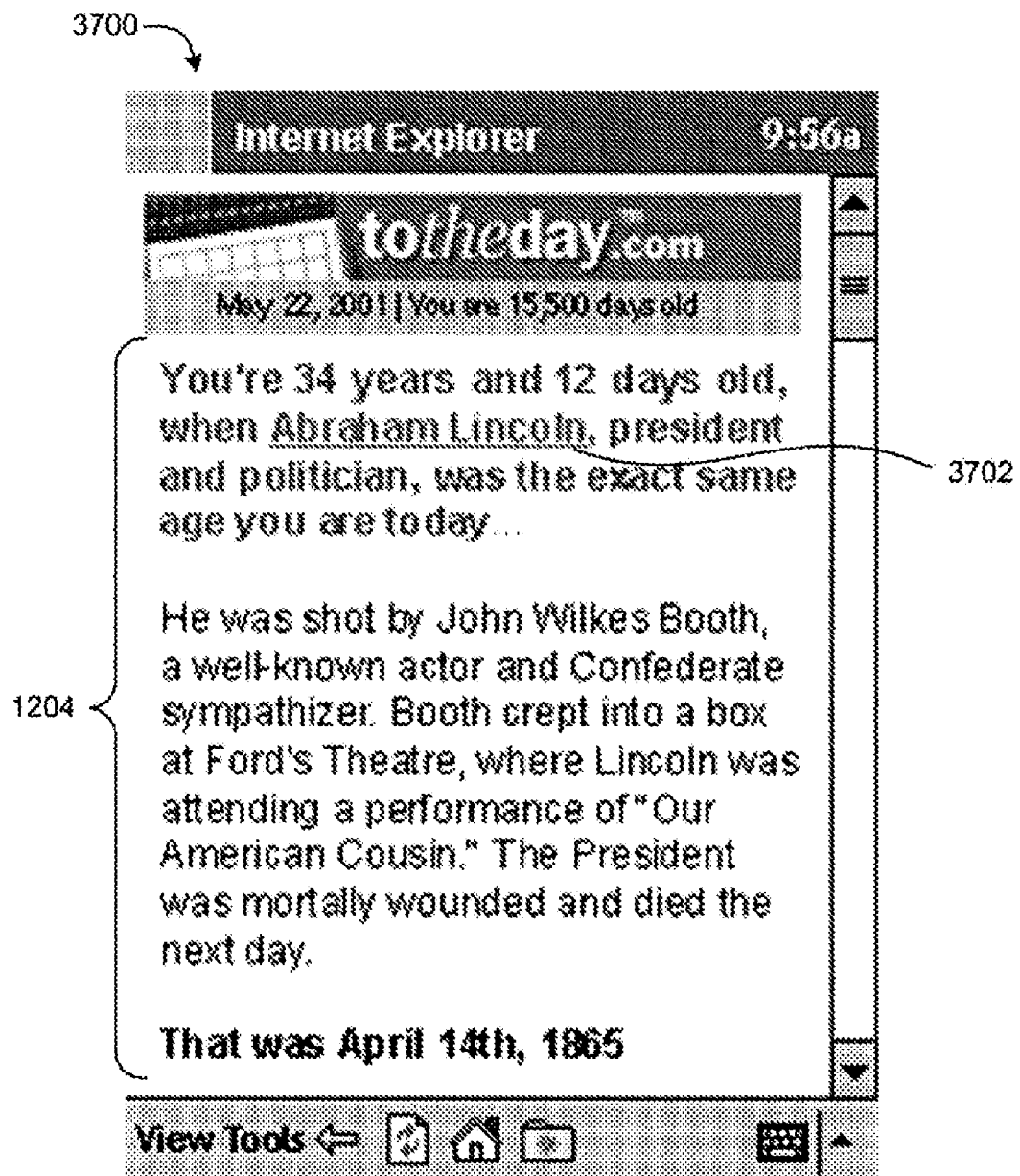
FIG. 37 is a pocket PC display showing an example of the TOTHEDAY event.

FIG. 37 is a pocket PC display 3700 showing an example of the TOTHEDAY event 1204. The event 1204 can contain a link 3702 to a biography and/or timeline/ageline about the individual referenced in the event 1204.

Figure 38:
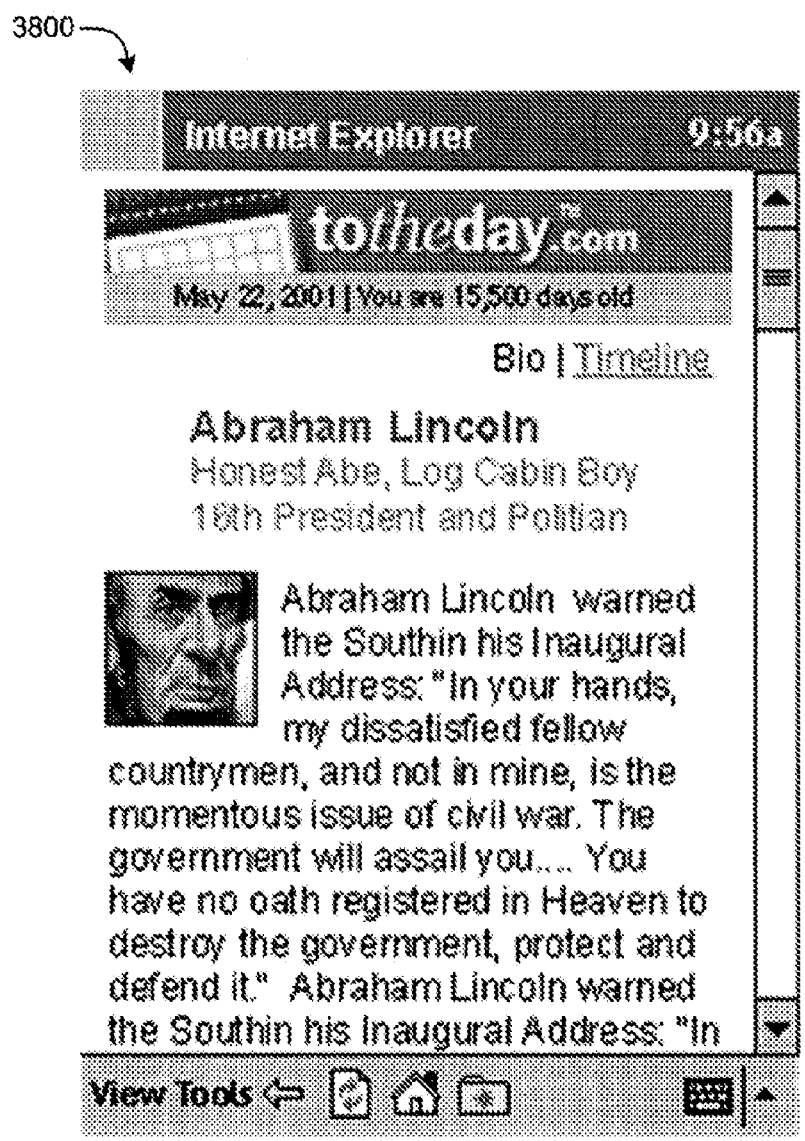
FIG. 38 is a pocket PC display showing an example of the biography of the individual.

FIG. 38 is a pocket PC display 3800 showing an example of the biography of the individual.

Figure 39:
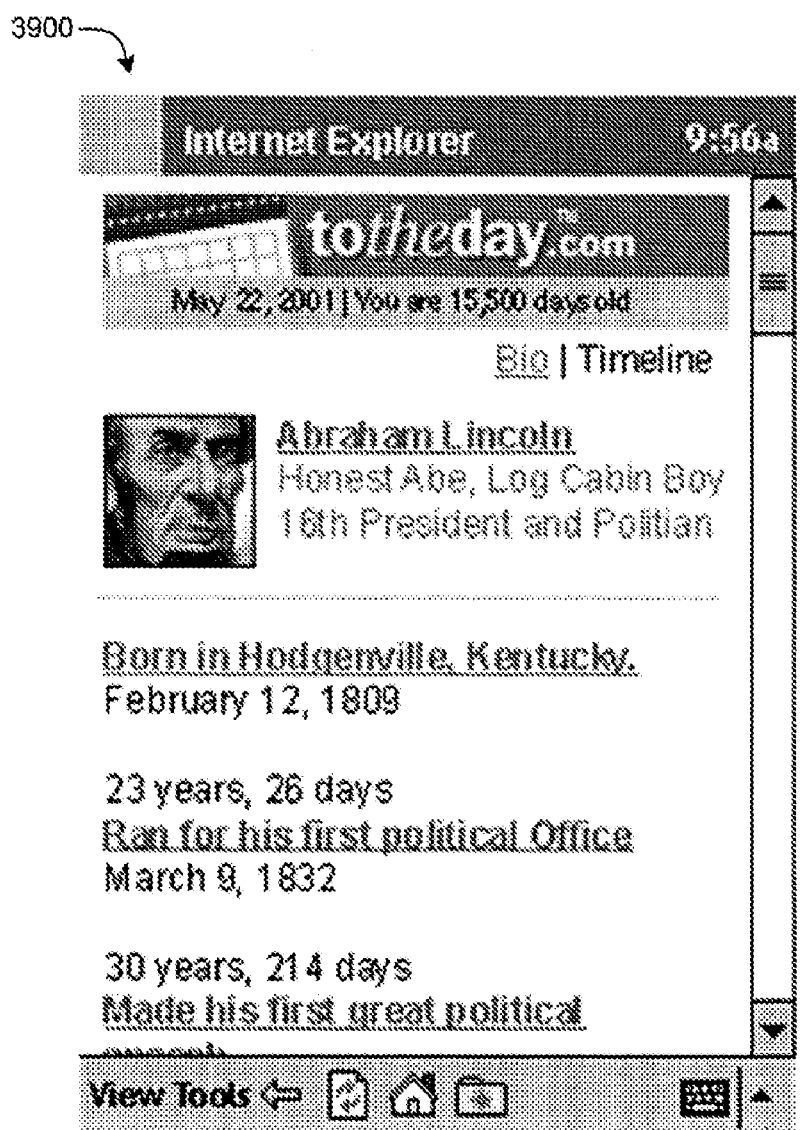
FIG. 39 is a pocket PC display showing an example of the timeline/ageline of events in the individual's life.

FIG. 39 is a pocket PC display 3900 showing an example of the timeline/ageline of events in the individual's life. Each event can be linked to an event page.

Figure 40:
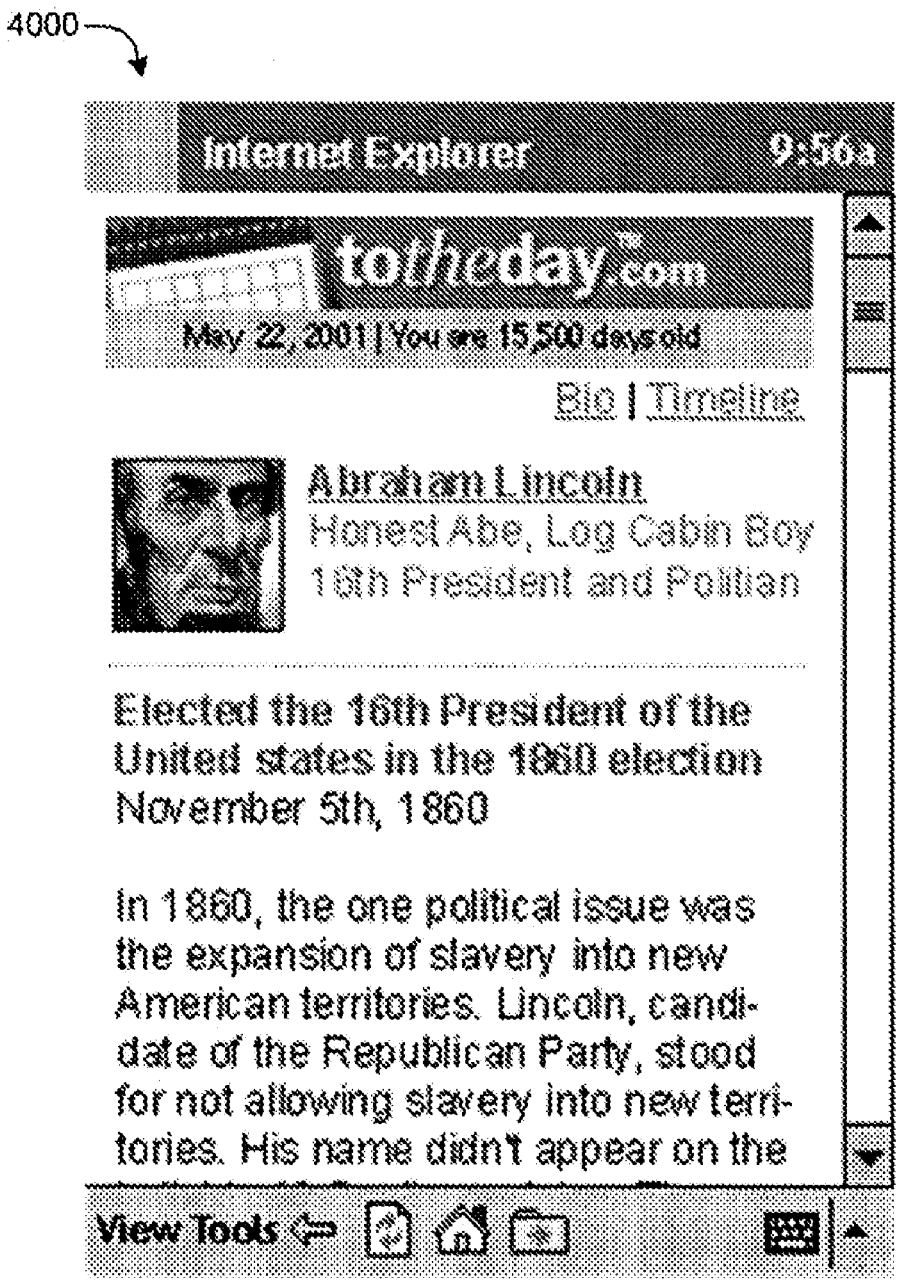
FIG. 40 is a pocket PC display showing the event page.

FIG. 40 is a pocket PC display 4000 showing the event page.

Figure 41:
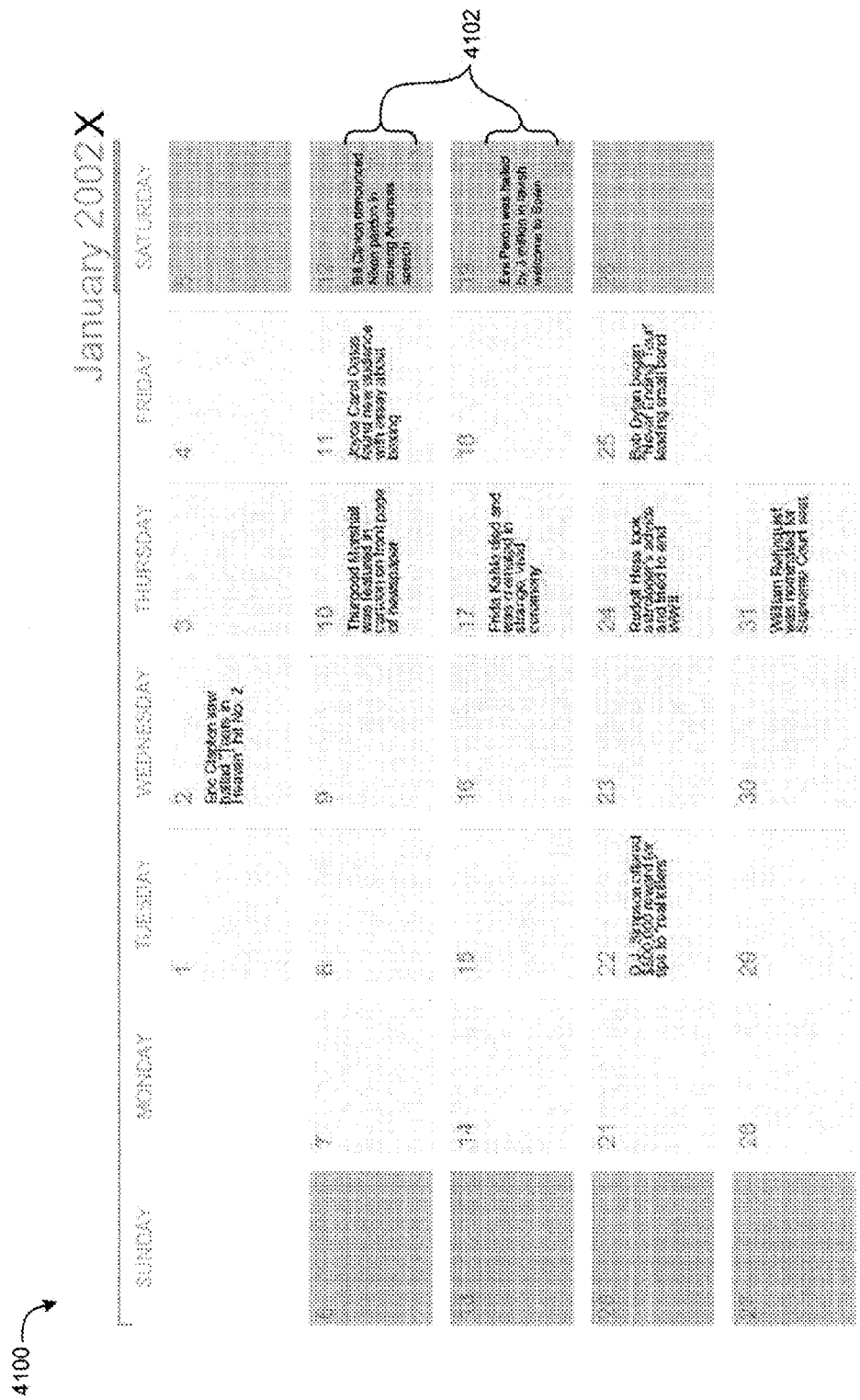
FIG. 41 illustrates a representative month in a TOTHEDAY Calendar.

FIG. 41 illustrates a representative month in a TOTHEDAY Calendar 4100. The calendar 4100 can be generated by entering an individual's date of birth, either via a special-purpose application or at the TOTHEDAY home page, such as that shown in FIG. 5. The server 208 then generates the calendar 4100 for any given year listing events 4102 on at least some of the days. Each event 4102 is placed on the day in which the individual is the exact same age as the notable person was at the time of the event. In other embodiments, the event can also include the date of the event, the exact age of the individual on that day, images of the luminaries, or other data in the event records. The calendars can cover any length of time, and "pages" of the calendar can cover arbitrary lengths of time such as weeks or months. For example, the calendar might devote one page to each month, one page to each week, or one page to each day. The events listed on the calendar can be contained within the space assigned for the day, or positioned/printed in adjacent areas, or even on facing or backing pages. The calendar can be displayed on a screen, delivered in printable electronic form such as email, download, or printed and delivered to the consumer in paper form.

The calendar is one example of content personalized to a person's age and provided in a batch basis. In other words, the server computer receives a query and gathers from the database a subset of records based on the query. This subset of records is then formatted for, and/or outputted to, a desired application or medium. In other embodiments, books or other print or electronic media can be customized to list events associated with different ages in the life of the person. For example, a book may contain events associated with each age in days for a person between 30 and 31 years old. The customized print media can be delivered to the user electronically, such as in a print-ready format, or in a hardcopy that could be ordered online or by other methods. In additional embodiments, content can be provided to a user in a batch basis by other methods. For example, the server could provide the user with events corresponding to the ages of the user over the next 15 days.

Figure 42:
FIG. 42 illustrates a sample TOTHEDAY game question.

FIG. 42 is illustrates a sample TOTHEDAY game question 4200. In one embodiment, events in the database can be presented in a quiz or game form, for individual or competitive play. These quizes and games can be electronic/interactive or paper-based. The quizes and games can include questions incorporating the day-ages (or ages in units of less than a year) of events. For example, an electronic (or paper/book-based) quiz can ask which of three people was exactly 10,000 days old when he/she did a particular thing, or which of three people was youngest, or how much younger one person was than another when he/she achieved something (e.g., a Nobel Prize, marriage, or publishing a first book). In other embodiments, a quiz can contain other questions that relate to timelines and/or agelines. The server may retrieve some or all of the records in the database to assemble either an electronic or paper-based game once the content/records have been assembled and stored.

In another embodiment, a quiz can be a game presented either electronically or in paper format (e.g. board game) and involve scoring and competition between players and scoring. In one aspect of this embodiment, biographical data arranged on agelines can form the basis for board-game questions. In addition to multiple-choice questions that involve the relative ages of subjects, players can guess the number of days, months, seasons, or other intervals between the achievements/experiences of the people in the game. In another aspect of the embodiment, points can be scored by being the closest of the competitors to guessing the age of somebody at the time of a specific event. In a further aspect of the embodiment, each player starts the game as a newborn (0 days old) and gets points (corresponding to days of life) for winning various questions. The object of the game could be to "live the longest" among the competitors, or outlive various notable peoples. Losing a round could cause a player to "lose a year of his/her life."

Figure 43:
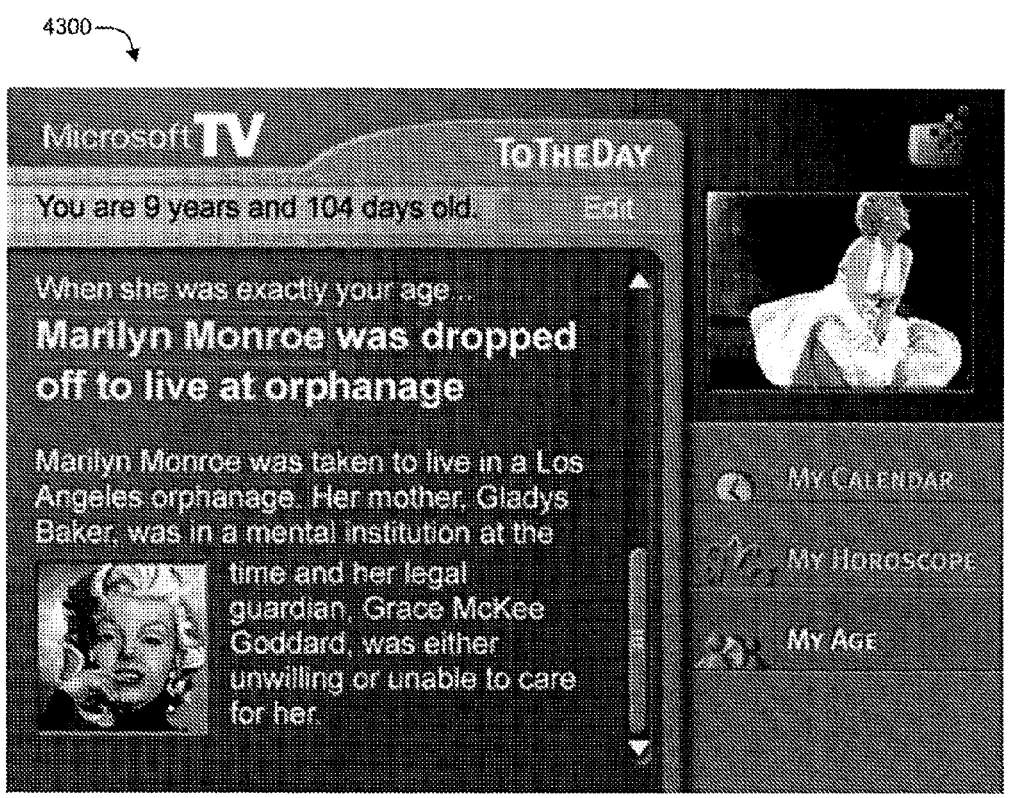
FIG. 43 is an example of a Microsoft TV TOTHEDAY display that includes self-explanatory portions.

FIG. 43 is an example of a Microsoft TV TOTHEDAY display 4300 that includes self-explanatory portions. Importantly, the display 4300 includes the TOTHEDAY section that can be customized to display events associated with the exact age of the user.

Figure 44:
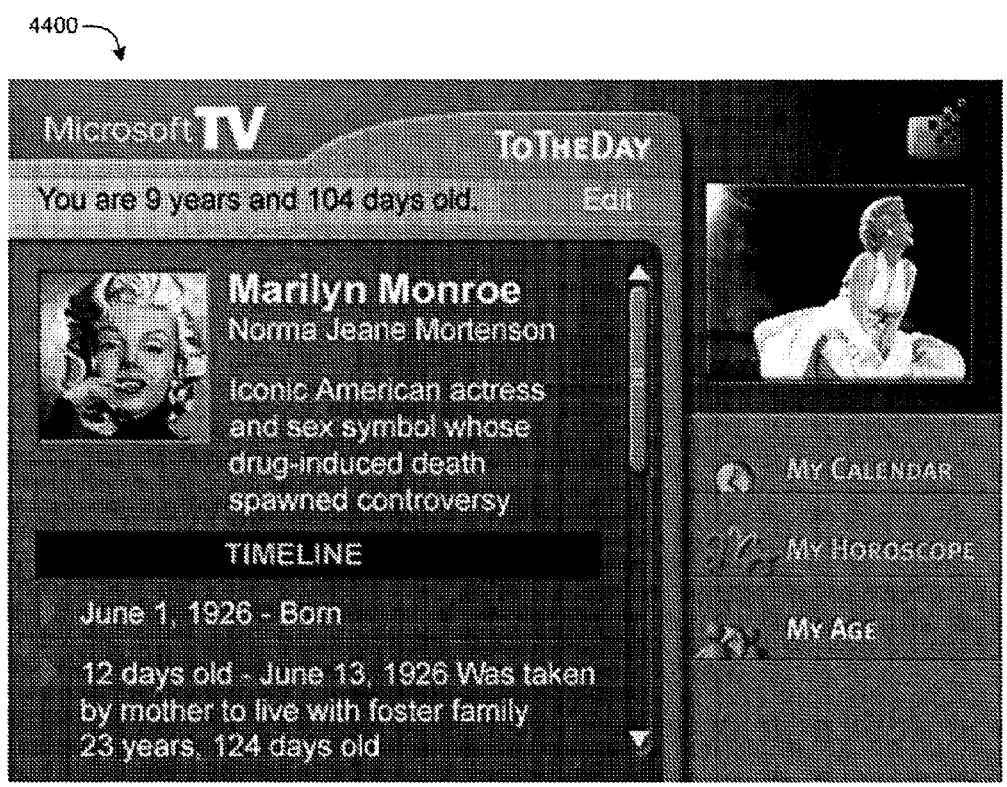
FIG. 44 is an example of a Microsoft TV TOTHEDAY timeline/ageline page detailing different events in the life of a particular person.

FIG. 44 is an example of a Microsoft TV TOTHEDAY timeline/ageline page 4400 detailing different events in the life of a particular person.

In one embodiment, the concept and technology of TOTHEDAY can be applied to community created content as well as professionally created content. An example of community created content would be people who use the service as a diary creating descriptions or records of what they did at particular ages. These entries can be in the form of milestones: "got married," "first job," "arrested." Or they can be as extensive as a daily diary. Because all content would be tagged with the age of the person on the day of the recorded events, this content could be delivered to other people when they happened to be the same age as the recorded events or if they were for some reason interested in that particular age. Access to this data could be open to all or it could be restricted to particular people. If open to all, a user could go each day and see what numerous other people recorded in the past when they were the same age as the user is that day. If open to just selected people, such as the people in a My Circle list, it would allow people who know each other to compare their lives. It could also tell a wife that she is as old today as her husband was when they got married or had a child, for example. Another embodiment would allow people to express things that they want to accomplish and plot their lives against people who have accomplished at least one of their goals.

Most of the features discussed are interactive and electronic, in which data on a server is delivered daily or on demand. Some of the features are non-interactive and non-electronic, such as books that revolve around an age measured in years rather than around the age of a specific user. There are also features/products in between. A custom- printed book or calendar printed in paper form that delivers personalized content for a span of time (week, month, year) for a user born on a specific date is an interactive application (although only mildly, in that there is only one interaction) that is non-electronic. It's also possible to create non-interactive but electronic features. For example, a customized calendar can be created that is displayed in static form on a screen (like a screen saver of an e-paper document) or a customized book readable with Microsoft Reader or another tool for the consumption of content that is conventionally presented in paper form but can also be presented in electronic form. In general, electronic non-interactive products can be downloaded to a client for local storage. TOTHEDAY data can be downloaded into a local copy of Outlook, so that the calendar feature or "Outlook Today" feature of that program would be enriched with personalized data. Just because content is stored locally, or on a local network rather than on the servers of the service that provides TOTHEDAY content, doesn't mean that it cannot be annotated by the user (in much the way that a person can write on a paper publication).

A wide range of ages can be expressed with a granularity of less than a year. Most of the features described relate to a specific day-age, an approximation of a specific day-age, or a span that includes a specific day age. It is also possible to provide people with information on events that relate to their week, month, or season or age, or which correspond to a more complicated formula such as "the Christmas season of their 35th year," or the summer of their 29th year," or even "the first year after they were married." (Such an alternative embodiment would include a perpetual calendar at the server computer to determine month, seasons or holidays with respect to a person's day-age.) Each of these examples widens the definition of a user's age to be greater than a day but less than a year. Broadening the window that is considered a person's age leads to a lot more events being of potential interest, and it could give the user the opportunity to filter out events unlikely to be of maximum interest. For example, a user could ask for events of scientists or academics in the summer of their 29th years, which results further limited to those events that are highly regarded by other users of the service (as evidenced by the ratings users can give to events).

The content of each record 300 has value far into the future, or is "evergreen," meaning that its relevancy does not diminish over time. This is because the organizing principle of the data on an ageline, as opposed to a conventional timeline. The data remains valuable because on any given day it corresponds to the specific day-age of one or more actual or potential users. For example, a biographical item is relevant to somebody every day forever, because people will always be turning that age (in contrast, information organized on a timeline gets dated and feels divorced from "today").

A user can customize the content by choosing options regarding what kinds of information are delivered. For example, he or she can choose an "Area of Endeavor" of "Sports/Athletics," or an "Achievement Type" of "Awards," and receive information on only those days when there is an event relating to a sports or athletic award. Furthermore, multiple categories can be selected.

CONCLUSION

One skilled in the relevant art will appreciate that the concepts of the invention can be used in various environments other than the Internet. For example, the concepts can be used in an electronic mail environment in which the age data can be collected and the personalized data can be provided to the user through electronic mail forms and messages. In general, a display description may be in HTML format, email format or any other format suitable for displaying information (including character/code-based formats, algorithm-based formats (e.g., vector generated), and bitmapped formats). Also, various communication channels may be used, such as a local area network, wide area network, or a point-to-point dial-up connection instead of the Internet. The server system may comprise any combination of hardware or software that can support these concepts. In particular, a web server may actually include multiple computers. A client system may comprise any combination of hardware and software that interacts with the server system. The client systems may include television-based systems, Internet appliances and various other consumer products in which data may be received and sent, such as wireless computers (palm-based, wearable, mobile phones, etc.).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. For example, while functions are presented in a given order, alternative embodiments may perform functions in a different order, or functions may be performed substantially concurrently. The teachings of the invention provided herein can be applied to other systems, not only the system described herein. For example, text to speech capabilities may be provided to convert the text stored in each record to spoken words, which may then be transmitted to users over the telephone network. Thus, the system may provide daily or periodic voicemail messages containing the content noted above. The various embodiments described herein can be combined to provide further embodiments.

The elements and acts of the various embodiments described above can be combined to provide further embodiments. All of the above U.S. patents and applications and other references are incorporated herein by reference. Aspects of the invention can be modified, if necessary, to employ the systems, functions and concepts of the various references described above to provide yet further embodiments of the invention.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A computer implemented method of generating personalized information, comprising:
    at a first computer, receiving age data related to the age of a user;
    at the first computer, receiving a request for information from the user;
    at the first computer, automatically identifying historical data in a database based on the age data,
        wherein the historical data includes information associated with an electronic diary entry created by another person different from the user,
        wherein the historical data is associated with an age of the other person when the other person created the electronic diary entry, and
        wherein the age of the other person is defined with respect to a granularity of a month or less; and
    at the first computer, automatically providing the historical data to the user.

2. The method of claim 1 wherein the historical data includes a digital image.

3. The method of claim 1 wherein the historical data includes a link to a digital image.

4. The method of claim 1 wherein the historical data includes a digital image of the other person.

5. The method of claim 1 wherein the historical data includes a link to a digital image of the other person.

6. The method of claim 1 wherein the historical data includes a link to another website.

7. The method of claim 1 wherein receiving age data includes receiving the user's date of birth and determining an age in days based on the date of birth.

8. The method of claim 1, further comprising calculating the exact age of the user from the age data.

9. A computer-readable medium containing a data structure, the data structure comprising:
    a plurality of diary records associated with multiple people, wherein each diary record corresponds to an electronic diary entry created by an individual, and wherein each diary record comprises:
        an age field, wherein the age field corresponds to an age of the individual when the individual created the electronic diary entry, and wherein the age field has a level of specificity of a month or less; and
        an entry field, wherein the entry field is directly associated with the age field and corresponds to the electronic diary entry created by the individual.

10. The computer-readable medium of claim 9 wherein the entry field includes a digital image.

11. The computer-readable medium of claim 9 wherein the entry field includes a link to a digital image.

12. The computer-readable medium of claim 9 wherein the entry field includes a digital image of the individual.

13. The computer-readable medium of claim 9 wherein the entry field includes a link to a digital image of the individual.

14. The computer-readable medium of claim 9 wherein the entry field includes a link to another website.

15. The computer-readable medium of claim 9 wherein the age field has a level of specificity of a day.

16. A computer system for generating personalized information related to the age of a person, comprising:

means for receiving age data and a request for information with respect to the person;

means, coupled to the means for receiving, for storing multiple records of data, wherein each of the records includes entry data associated with an electronic diary entry of an individual and age data associated with an age of the individual when the individual created the electronic diary entry, and wherein the age data has a level of specificity of a month or less;

means, coupled to the means for storing, for identifying corresponding entry data based on the age of the person; and means, coupled to the means for identifying, for providing relevant data, wherein the relevant data includes at least a portion of one of the multiple records associated with one individual and one entry data, and wherein the individual is different than the person.

17. The computer system of claim 16 wherein the relevant data includes a digital image.

18. The computer system of claim 16 wherein the relevant data includes a link to a digital image.

19. The computer system of claim 16 wherein the relevant data includes a digital image of the individual.

20. The computer system of claim 16 wherein the relevant data includes a link to a digital image of the individual.

21. The computer system of claim 16 wherein the relevant data includes a link to another website.

22. The computer system of claim 16 wherein the age data has a level of specificity of a day.

\* \* \* \* \*